Figure 1:
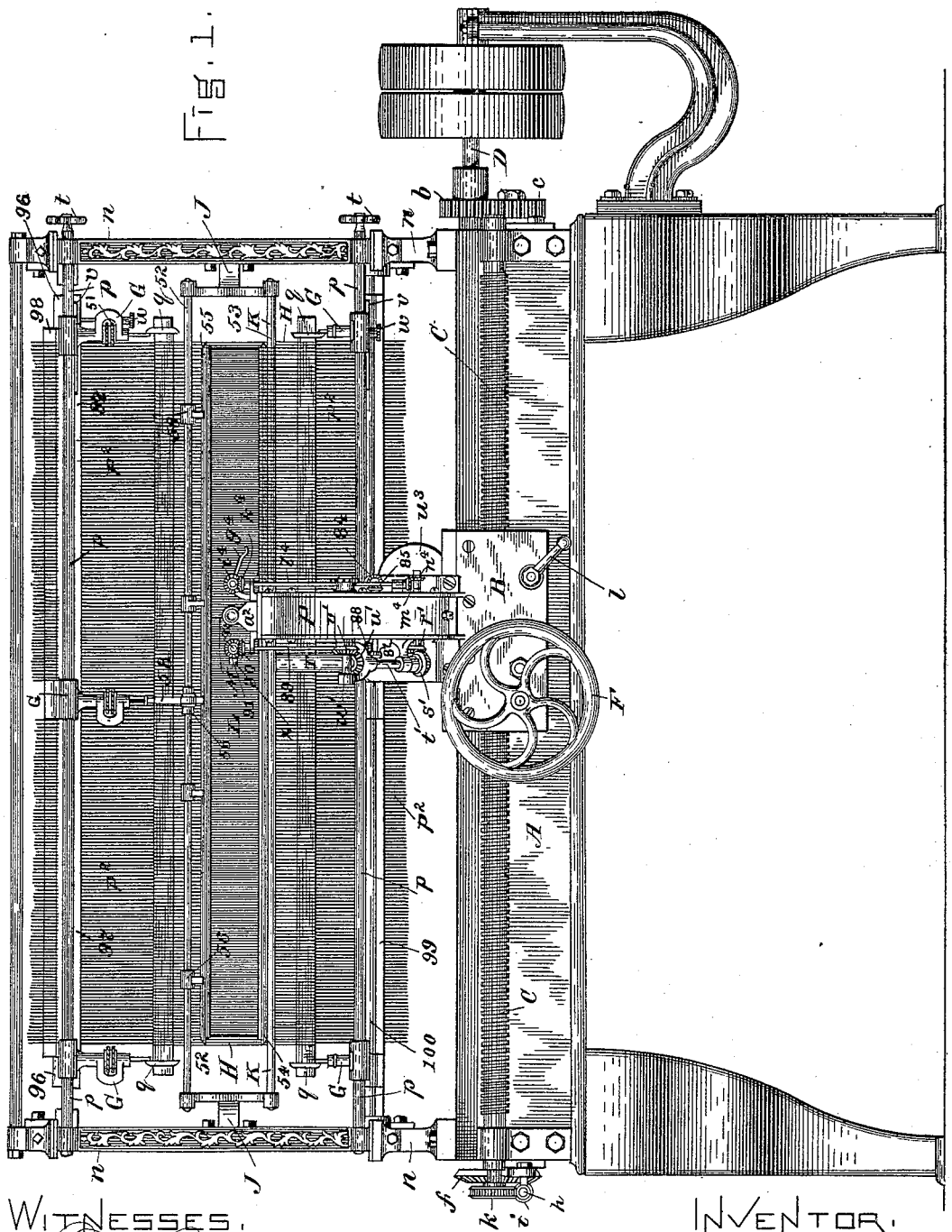

(No Model.)   17 Sheets—Sheet 1.

R. H. INGERSOLL.
MACHINE FOR DRAWING IN WARP THREADS.

No. 461,613.   Patented Oct. 20, 1891.

Witnesses:
Henry Marsh.
Harry H. Aiken.

Inventor:
Richmond H. Ingersoll,
by P. E. Teschemacher
Atty.

(No Model.) 17 Sheets—Sheet 2.

R. H. INGERSOLL.
MACHINE FOR DRAWING IN WARP THREADS.

No. 461,613. Patented Oct. 20, 1891.

(No Model.)  17 Sheets—Sheet 3.

R. H. INGERSOLL.
MACHINE FOR DRAWING IN WARP THREADS.

No. 461,613.  Patented Oct. 20, 1891.

Witnesses.
Henry Marsh.
Harry W. Aiken

Inventor.
Richmond H. Ingersoll,
by E. Teschemacher
Att'y.

(No Model.)  17 Sheets—Sheet 4.
R. H. INGERSOLL.
MACHINE FOR DRAWING IN WARP THREADS.
No. 461,613.  Patented Oct. 20, 1891.

WITNESSES.

INVENTOR.
Richmond H. Ingersoll, (No Model.) 17 Sheets—Sheet 6.

R. H. INGERSOLL.
MACHINE FOR DRAWING IN WARP THREADS.

No. 461,613. Patented Oct. 20, 1891.

Witnesses:
Henry Marsh.
Harry W. Ashen.

Inventor,
Richmond H. Ingersoll,
by Teschemacher
Att'y.

THE NORRIS PETERS CO., PHOTO-LITHO., WASHINGTON, D. C.

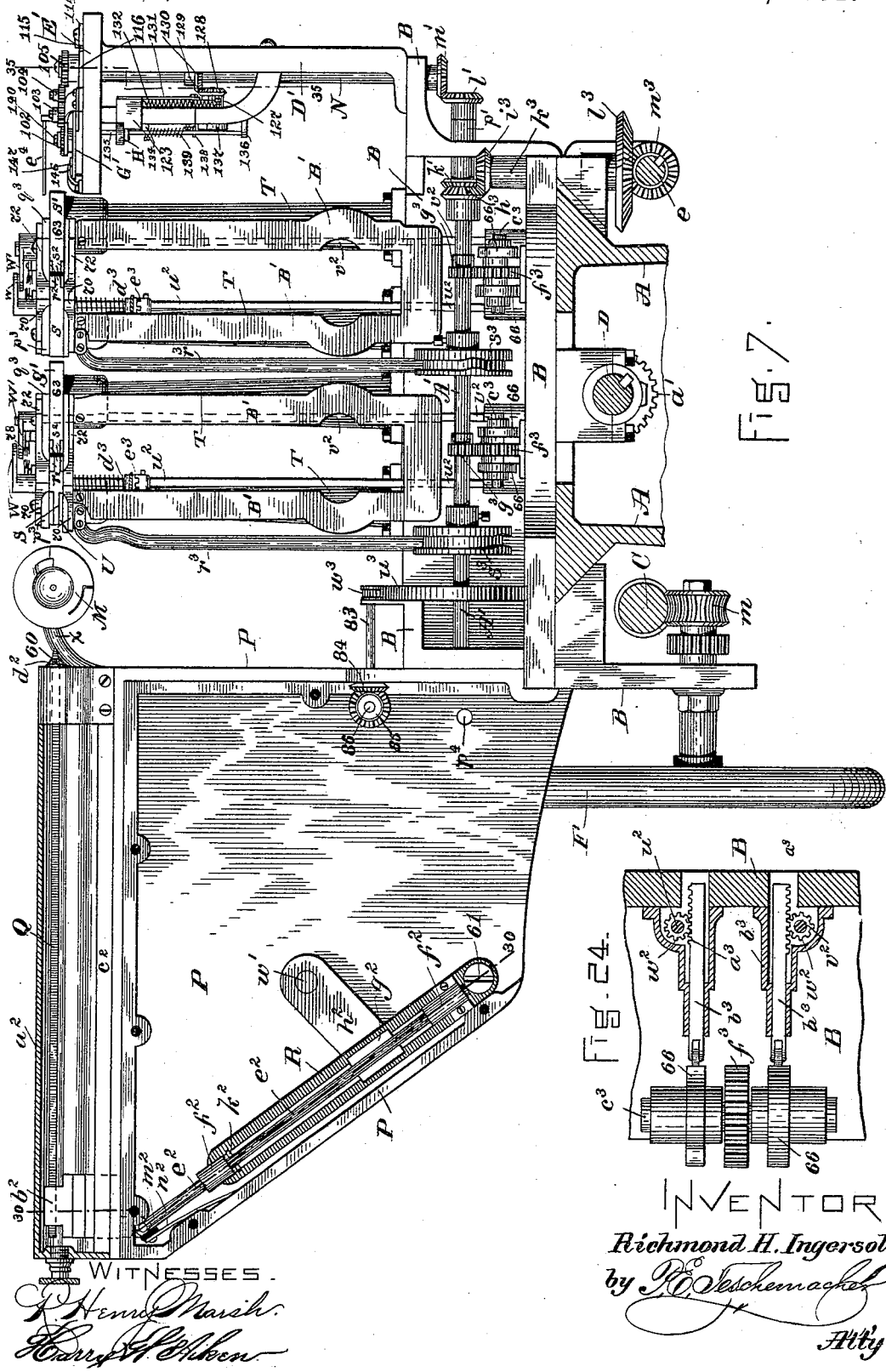

(No Model.) 17 Sheets—Sheet 8.
R. H. INGERSOLL.
MACHINE FOR DRAWING IN WARP THREADS.
No. 461,613. Patented Oct. 20, 1891.
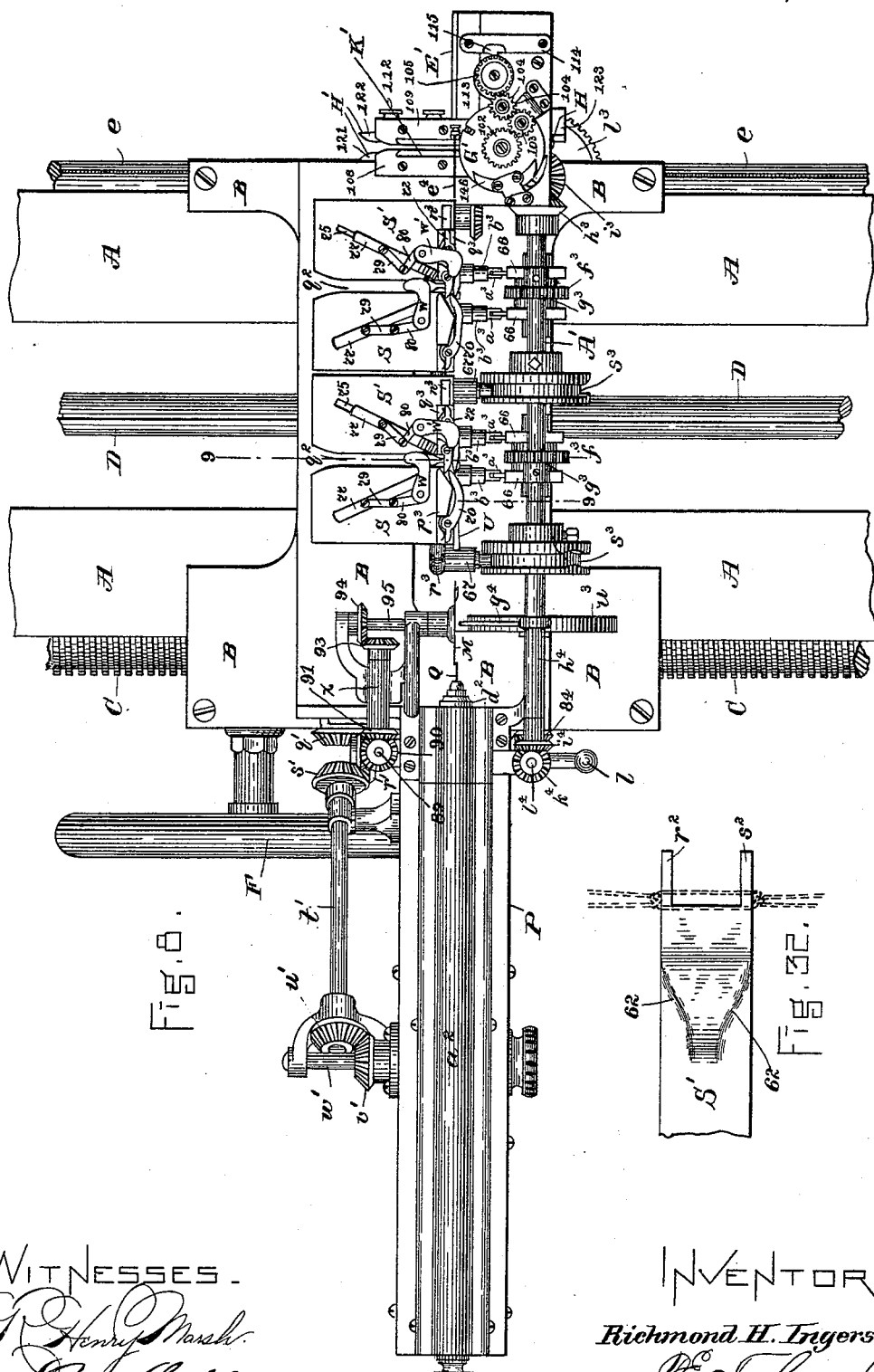
Witnesses.
Henry Marsh.
Harry W. Aiken.
Inventor.
Richmond H. Ingersoll,
by P. E. Teschemacher
Atty.

(No Model.) 17 Sheets—Sheet 9.
R. H. INGERSOLL.
MACHINE FOR DRAWING IN WARP THREADS.
No. 461,613. Patented Oct. 20, 1891.
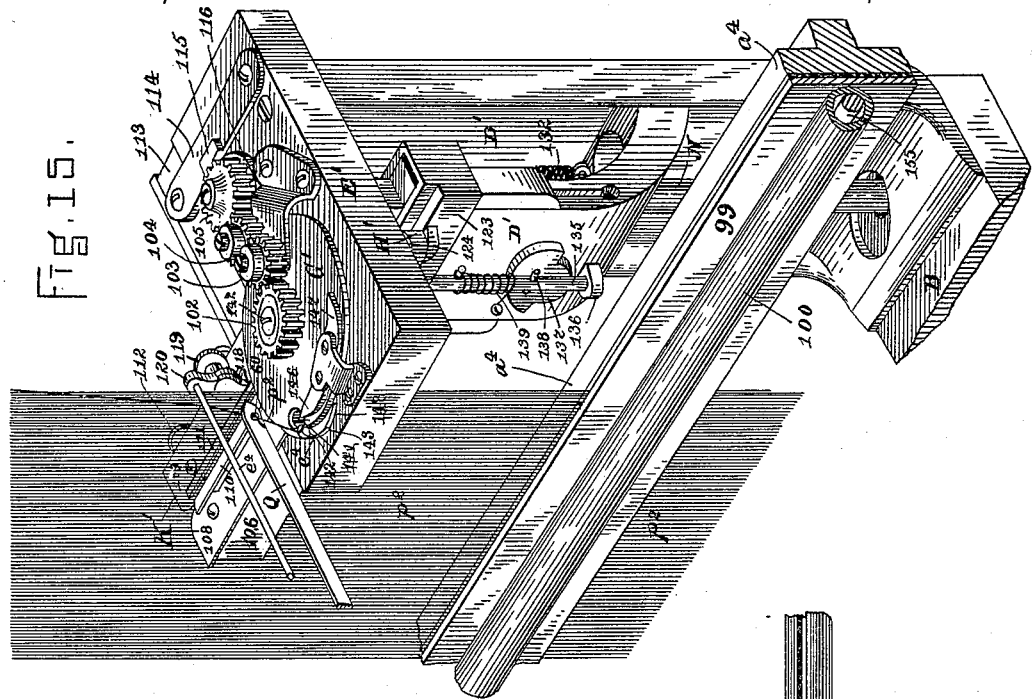
WITNESSES.
Henry Marsh
Harry W. Aiken
INVENTOR,
Richmond H. Ingersoll,
by R. E. Teschemacher
Atty.

(No Model.) 17 Sheets—Sheet 10.
R. H. INGERSOLL.
MACHINE FOR DRAWING IN WARP THREADS.
No. 461,613. Patented Oct. 20, 1891.
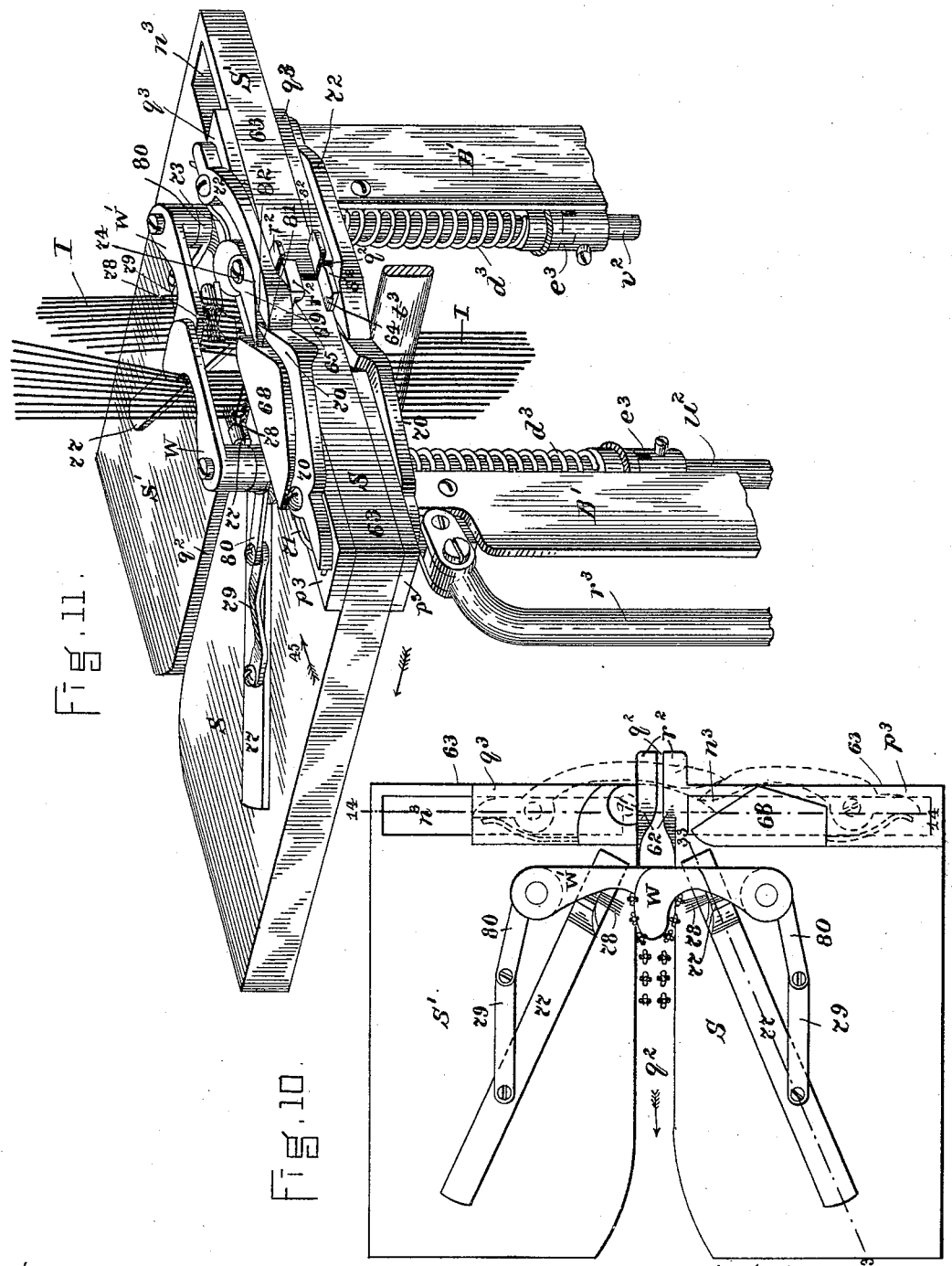
WITNESSES.
INVENTOR.
Richmond H. Ingersoll,
by ... Atty.

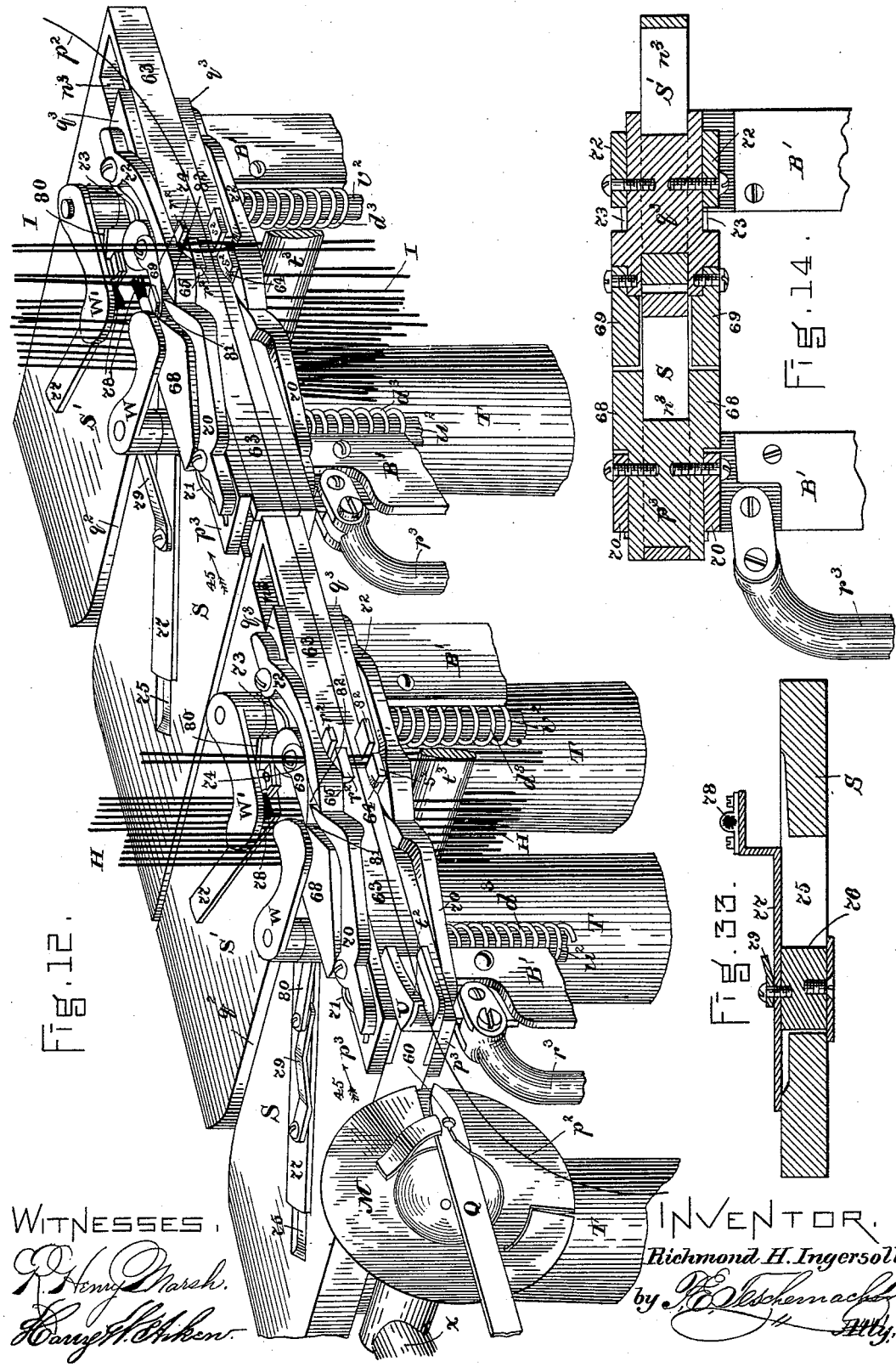

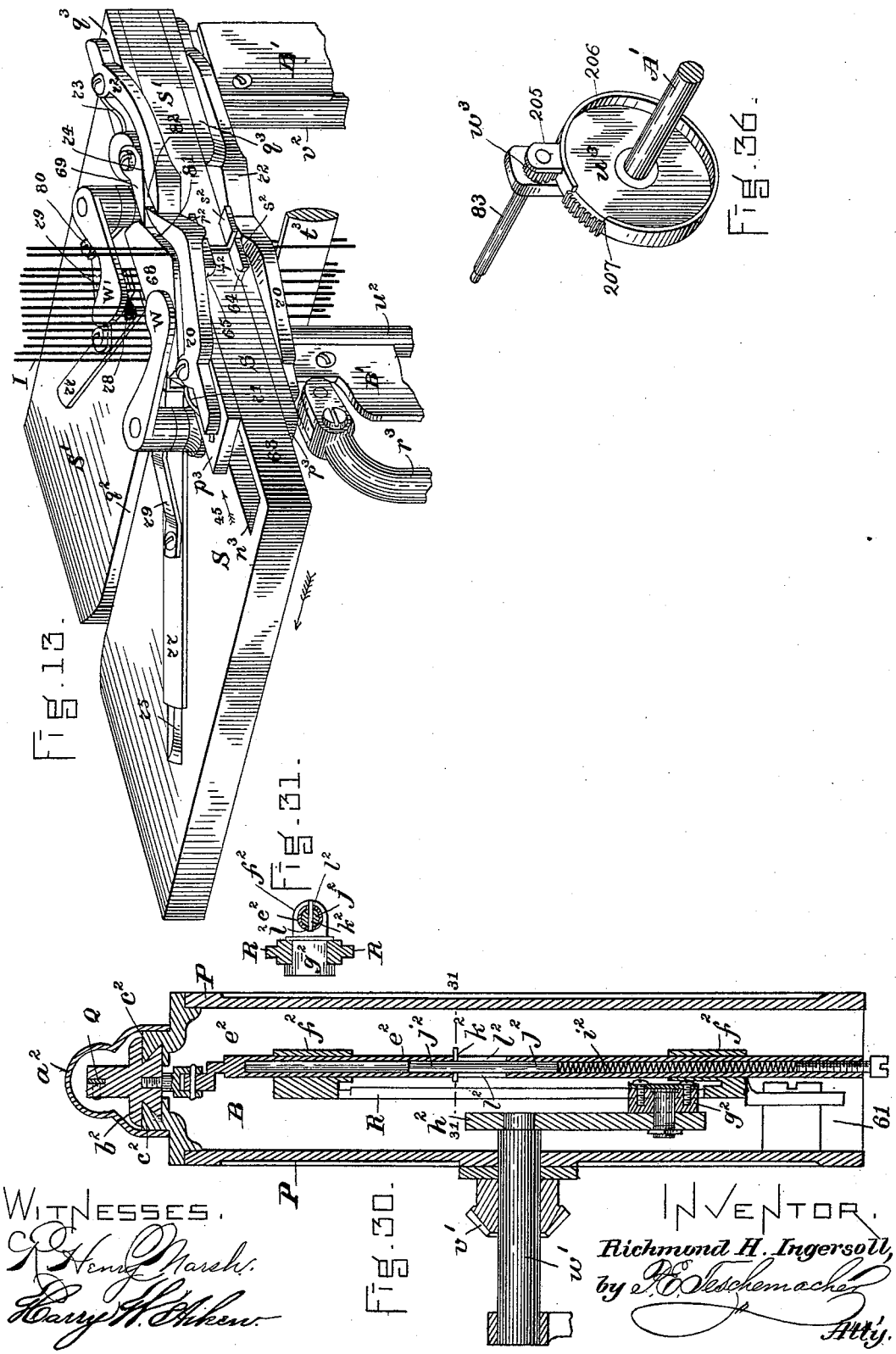

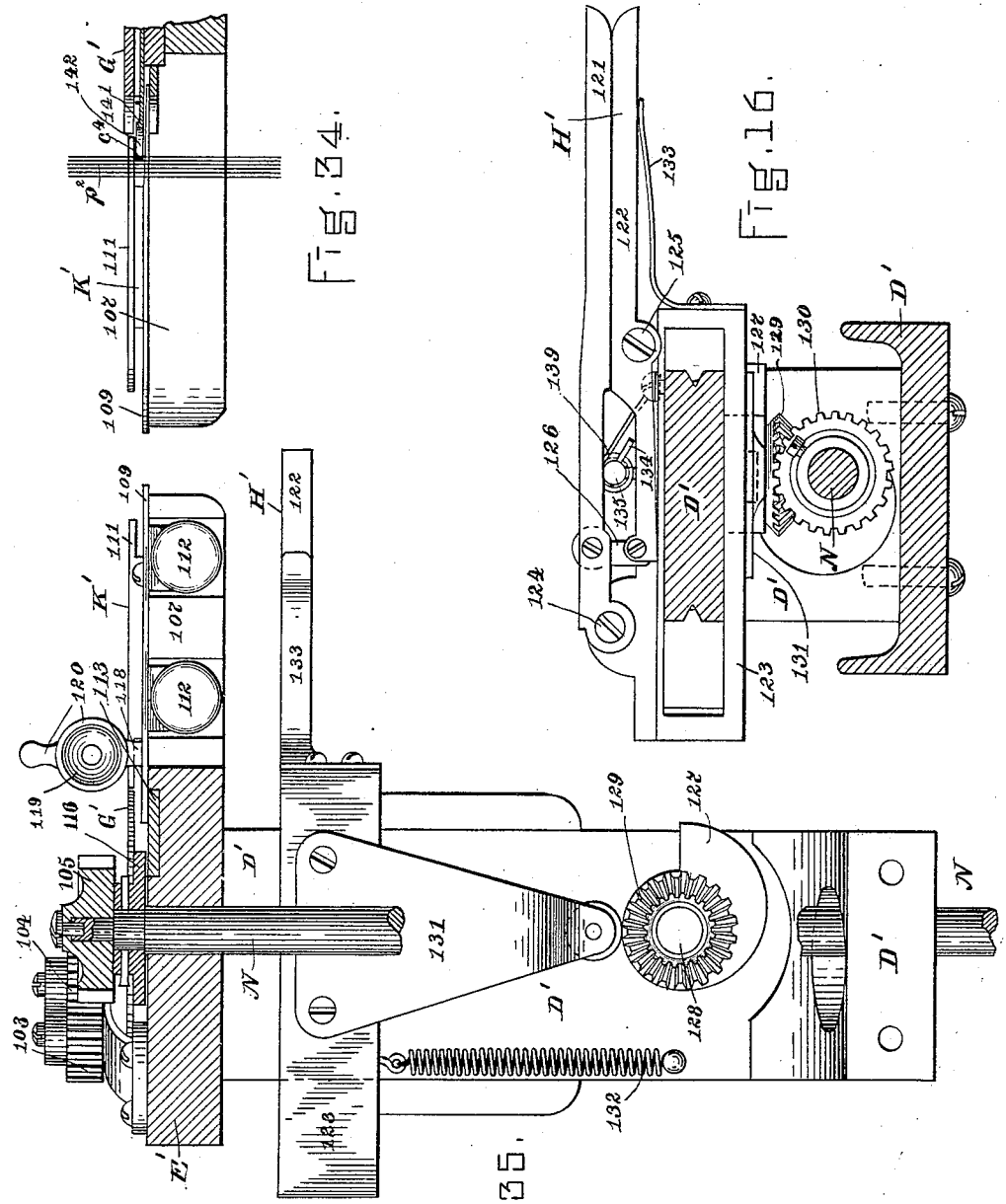

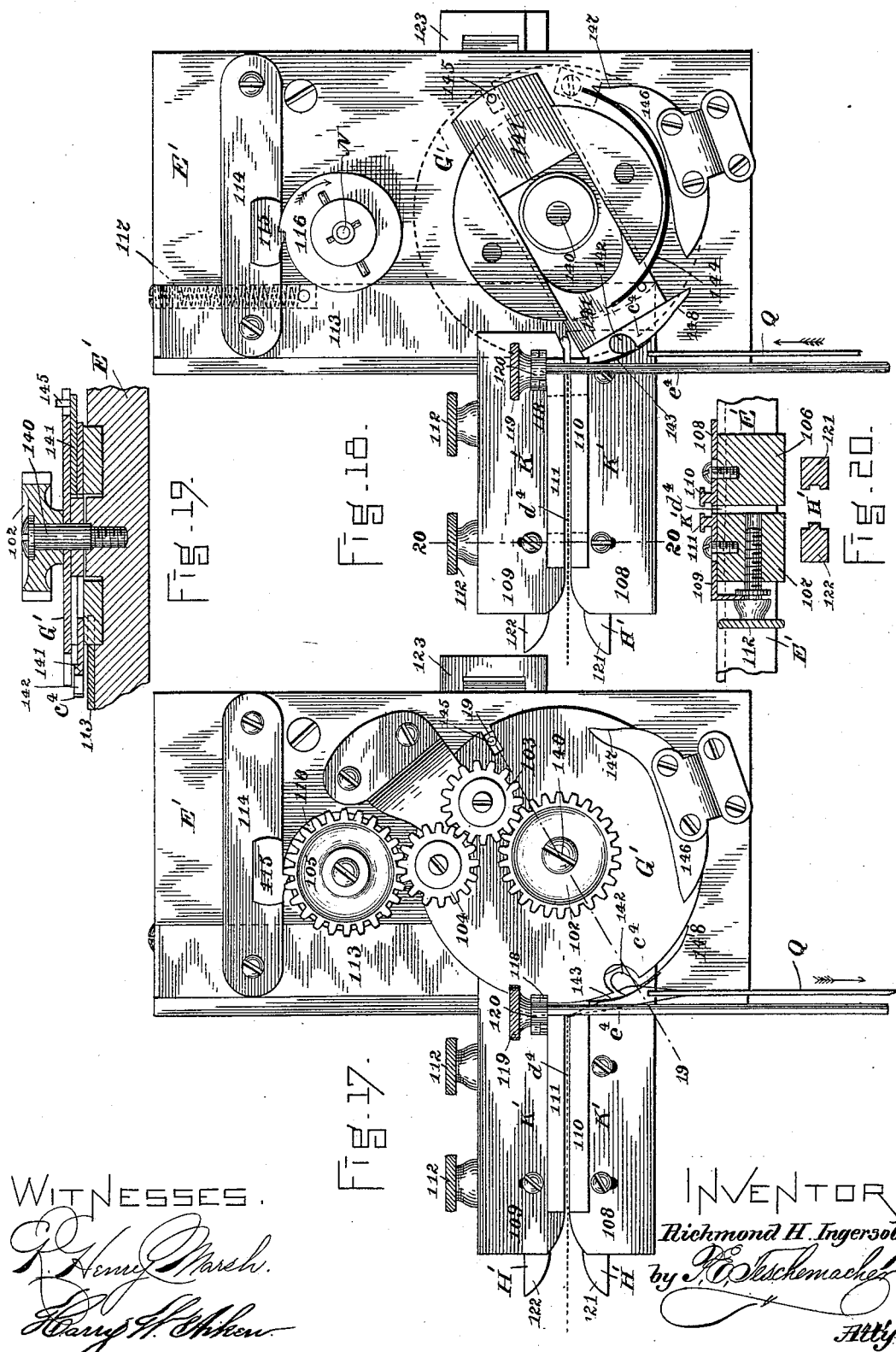

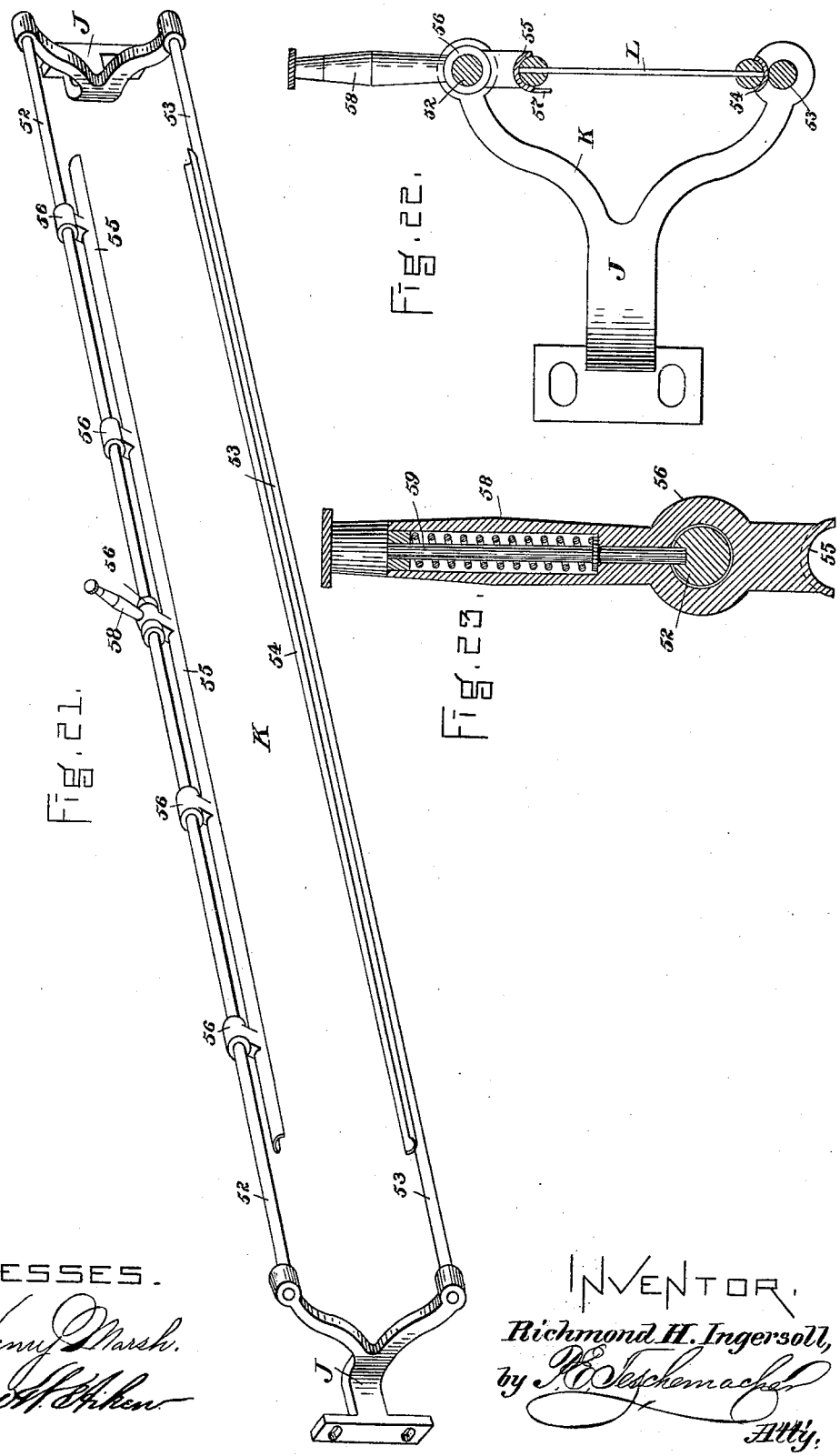

(No Model.)  17 Sheets—Sheet 16.
R. H. INGERSOLL.
MACHINE FOR DRAWING IN WARP THREADS.
No. 461,613. Patented Oct. 20, 1891.
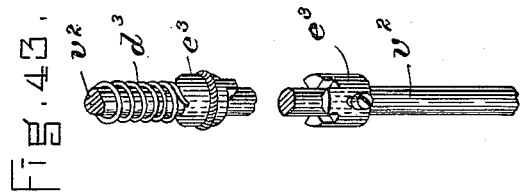
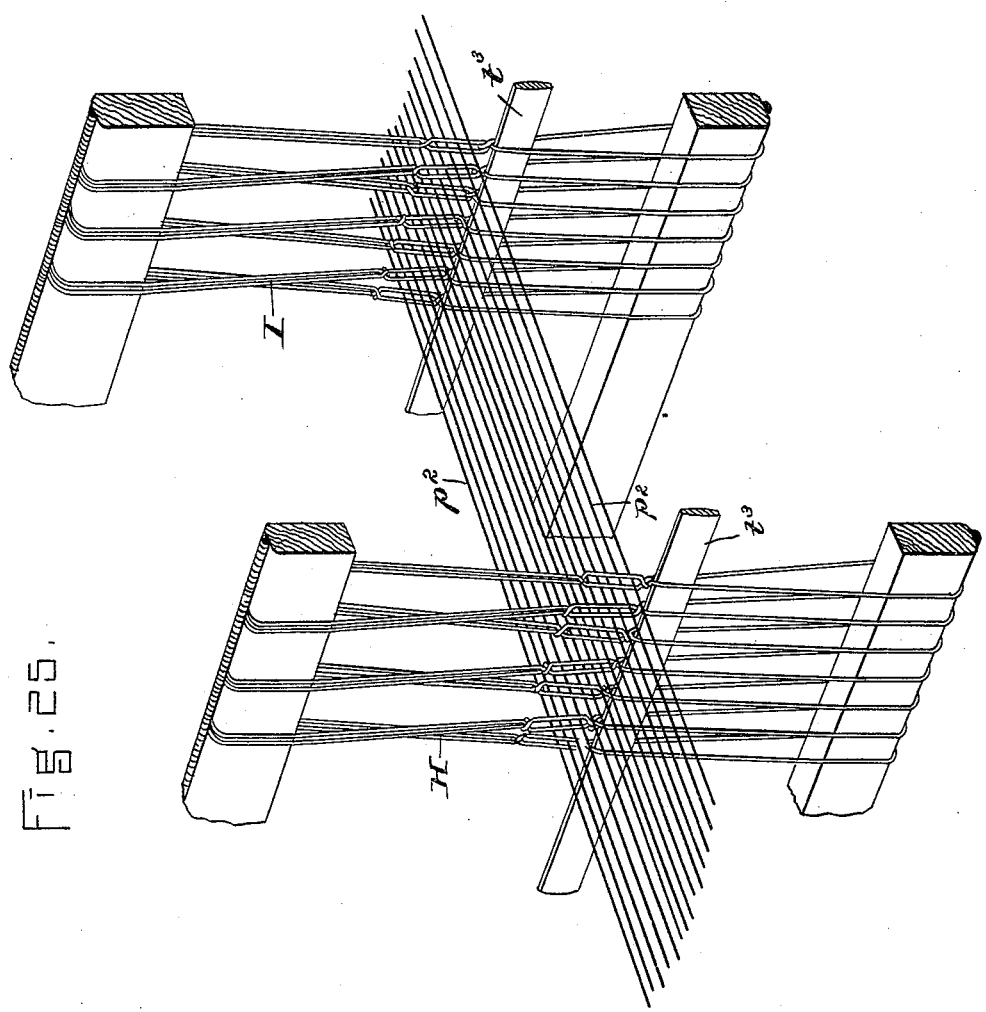
WITNESSES.  INVENTOR.
Richmond H. Ingersoll.
by
Atty.

(No Model.) 17 Sheets—Sheet 17.
R. H. INGERSOLL.
MACHINE FOR DRAWING IN WARP THREADS.
No. 461,613. Patented Oct. 20, 1891.
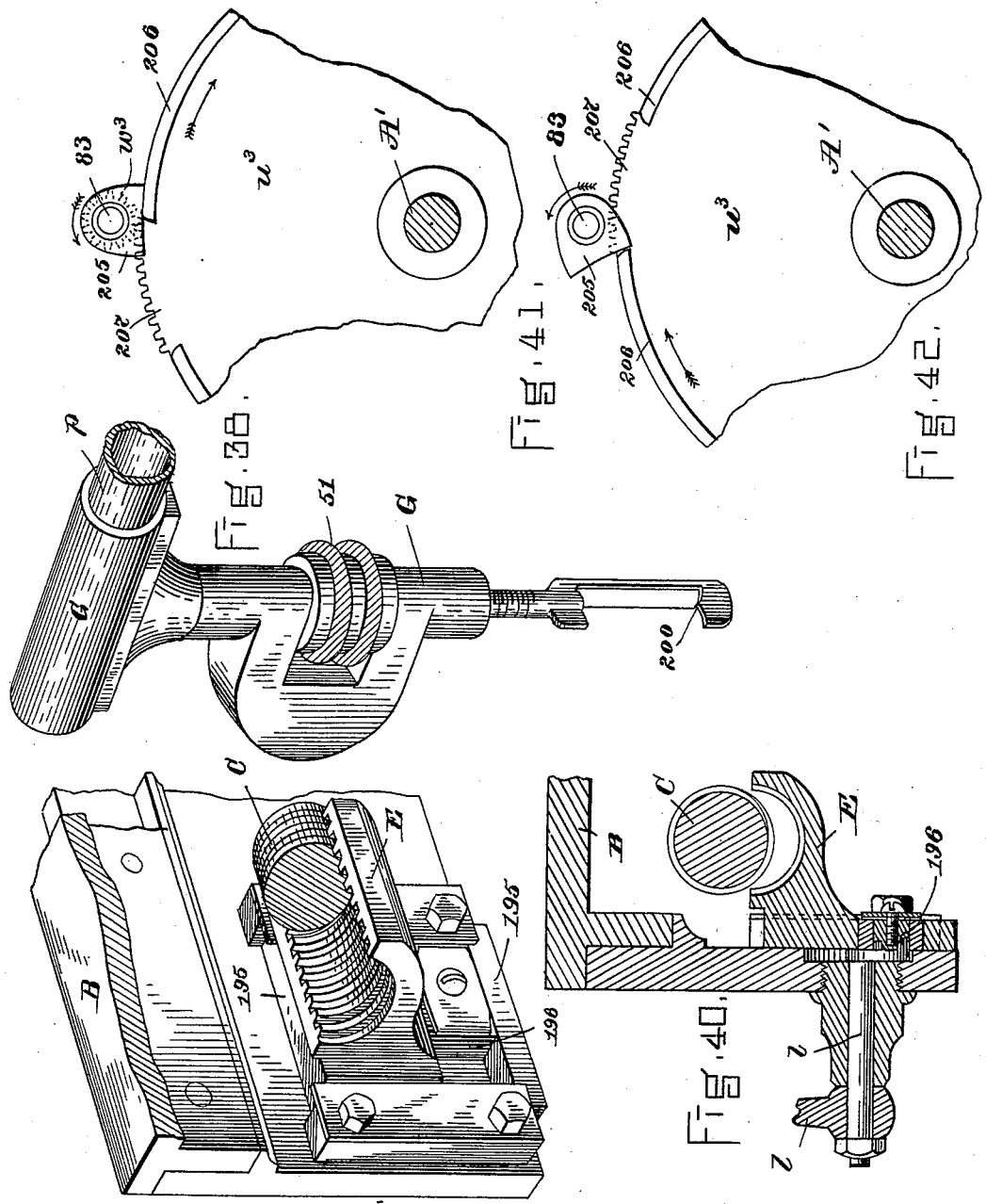

UNITED STATES PATENT OFFICE.

RICHMOND H. INGERSOLL, OF BIDDEFORD, MAINE.

MACHINE FOR DRAWING IN WARP-THREADS.

SPECIFICATION forming part of Letters Patent No. 461,613, dated October 20, 1891.

Application filed March 17, 1890. Serial No. 344,199. (No model.)

*To all whom it may concern:*

Be it known that I, RICHMOND H. INGERSOLL, a citizen of the United States, residing at Biddeford, in the county of York and State of Maine, have invented certain Improvements in Machines for Drawing in Warp-Threads, of which the following is a specification.

My invention consists in certain improvements, as hereinafter described, on the machines for drawing in warp-threads shown in Letters Patent No. 255,038, dated March 14, 1882, No. 282,124, dated July 31, 1883, No. 355,221, dated December 28, 1886, and No. 359,471, dated March 15, 1887.

My improvements relate, first, to mechanism for separating and holding the heddle-cords with their eyes in the path of the reciprocating needle; second, to mechanism for selecting the warp-threads and placing them one by one in the path of the needle, and, third, to various details embodied in the general construction of the machine, the object of my invention being to simplify the construction of the machine and render it more certain and reliable in its action.

Figure 2:
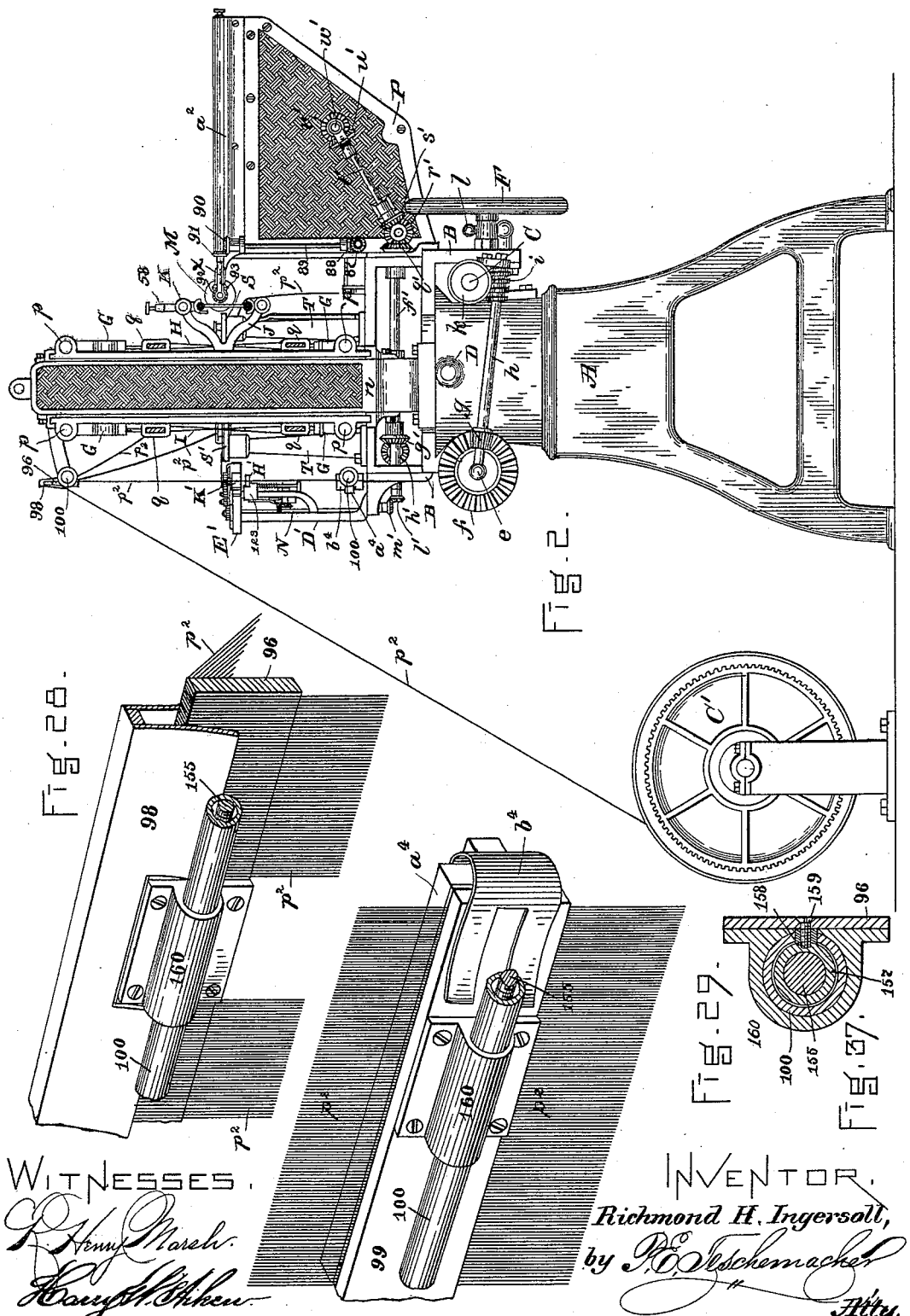
Figure 3:
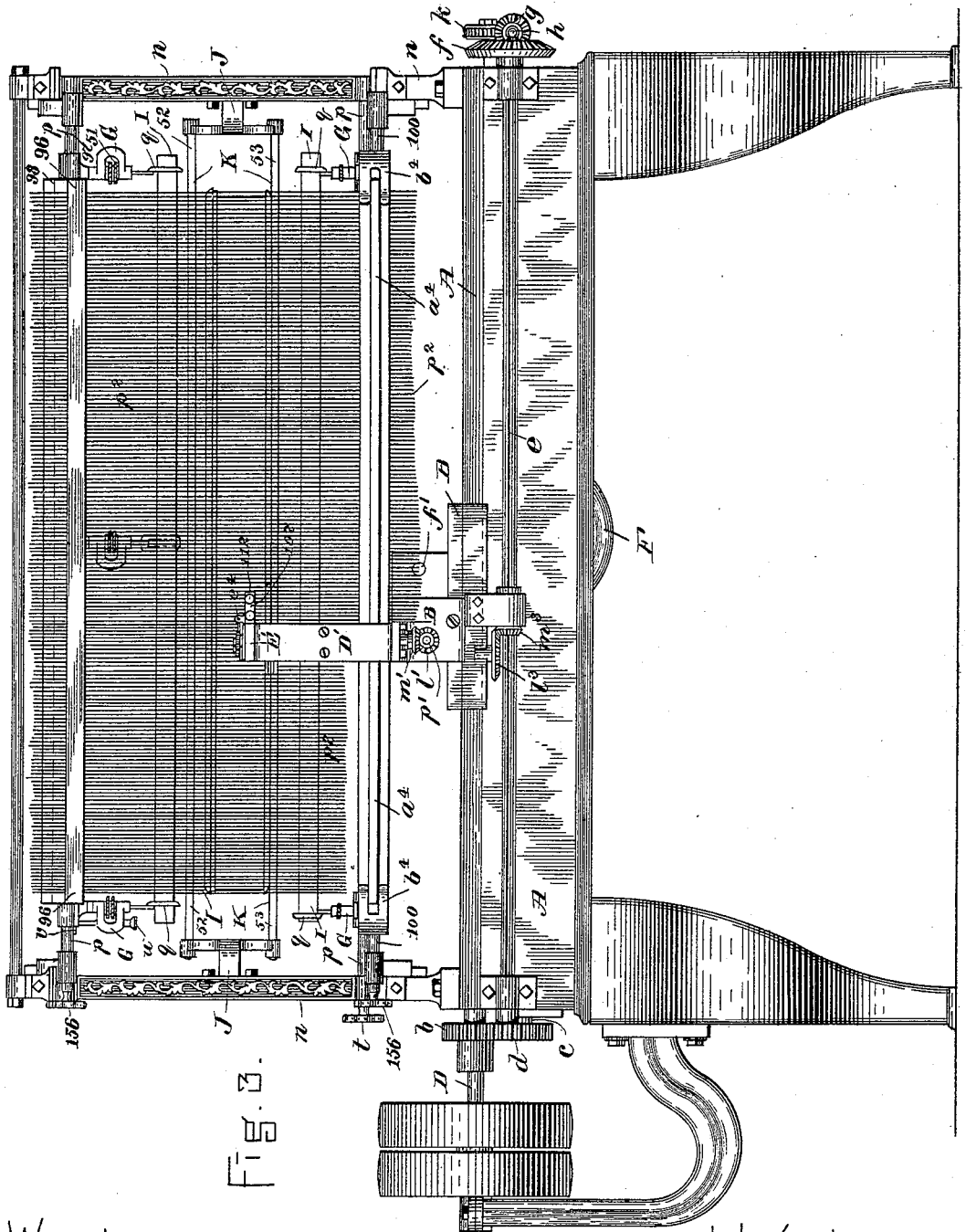
Figure 4:
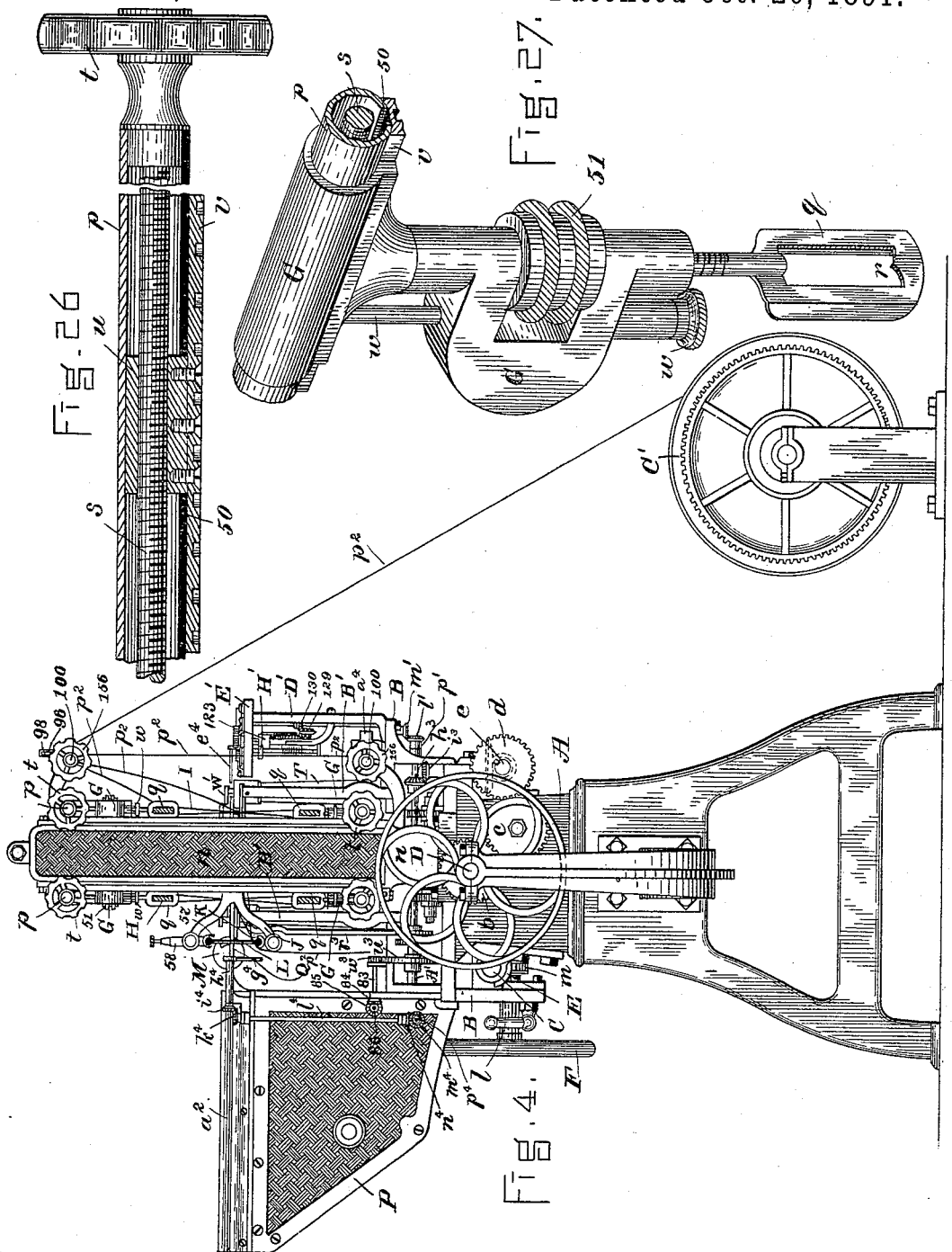
Figure 5:
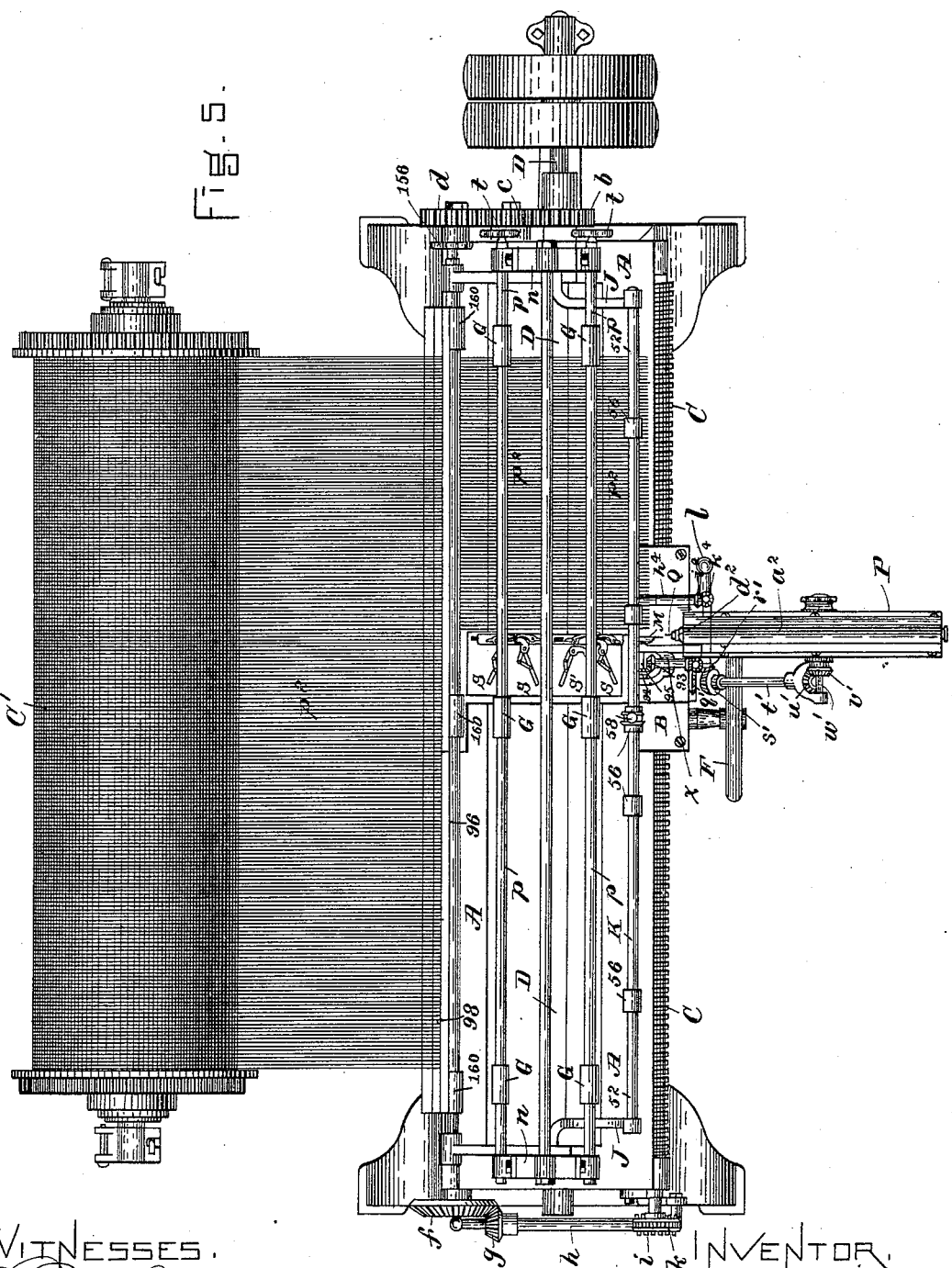
Figure 6:
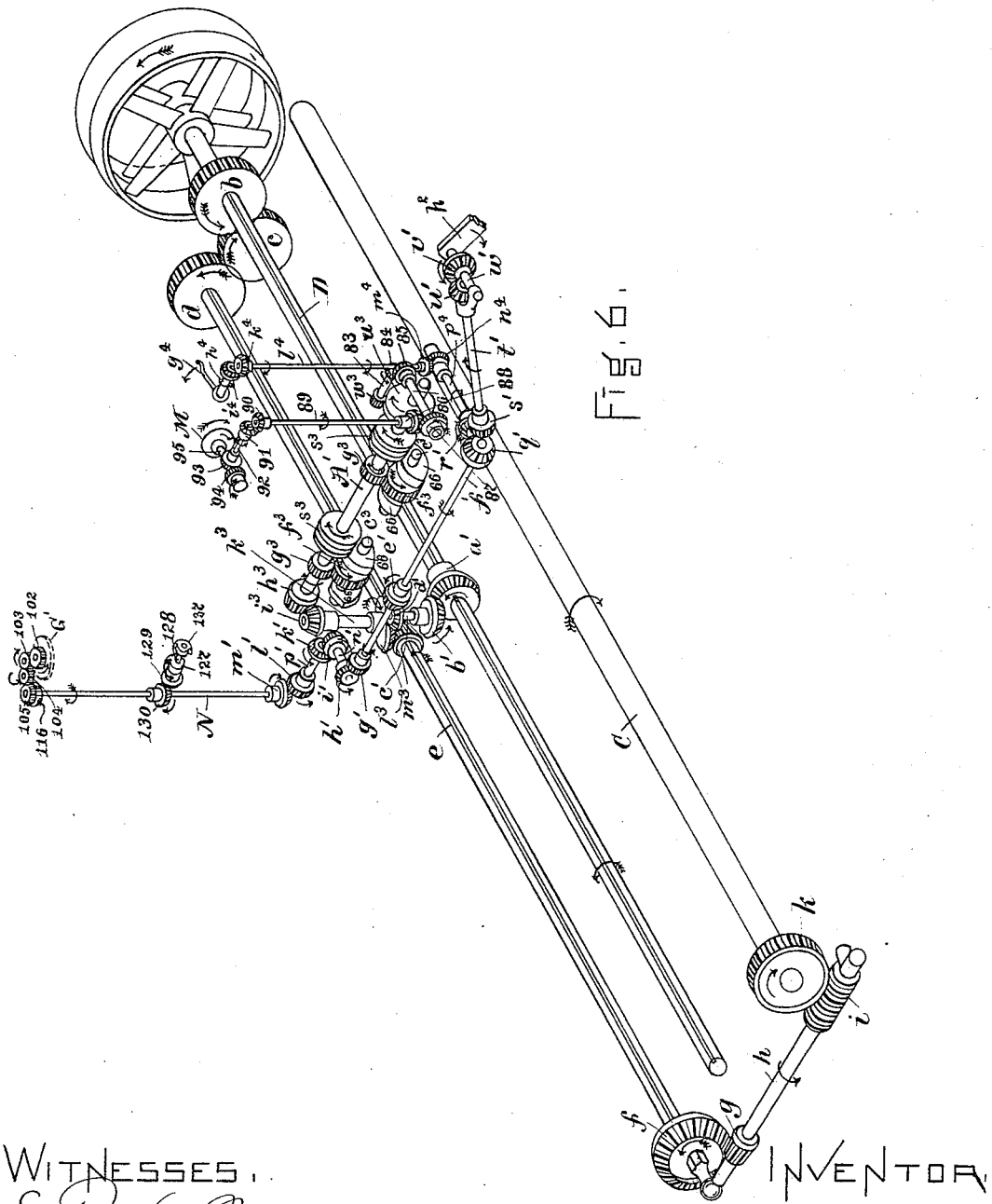

In the accompanying drawings, Figure 1 is a front elevation of a machine for drawing in warp-threads embodying my improvements, the warp-threads being shown broken off above the clamp. Fig. 2 is an elevation of the left side of the machine. Fig 3 is a rear elevation of the same. Fig. 4 is an elevation of the side of the machine opposite to that shown in Fig. 2. Fig. 5 is a plan of the machine. Fig. 6 is a perspective diagram showing the manner in which the power is transmitted from the driving-shaft throughout the machine. Fig. 7 is an enlarged side elevation of the carriage as shown in Fig. 4, one side of the box or casing upon which the warp-drawing needle is mounted being removed to show the needle-traversing mechanism and a part of the bed A being shown in section. Fig. 8 is a plan of the parts shown in Fig. 7. Fig. 9 is a section of the carriage on the line 9 9 of Fig. 8. Fig. 10 is a plan of one of the heddle-cord separators, showing the hold-back fingers, the spring pawl-shaped fingers being shown in dotted lines. Fig. 11 is a perspective view of one of the heddle-cord-separating devices, the hold-back fingers being in the positions which they occupy when holding back both series of heddle-cords. Fig. 12 is a perspective view of the two heddle-cord-separating devices for acting on the cords of the two heddles, the said cords being shown in the second, fourth, and fifth positions. Fig. 13 is a perspective view of one of the heddle-separators with the heddle-cord in the third position. Fig. 14, Sheet 11, is a vertical transverse section of the rear ends of the platforms which support the heddle-cord-separating devices, taken on the line 14 14 of Fig. 10. Fig. 15, Sheet 9, is a perspective view of the warp-thread-selecting device and the standard or frame for supporting the same. Fig. 16, Sheet 13, is an enlarged horizontal section on the line 16 16 of Fig. 9. Fig. 17, Sheet 14, is a plan of the warp-thread-selecting device with both pairs of jaws or nippers open, the warp-drawing needle having just caught a thread and being in the act of pulling it through the eye of the selecting-hook and out from the lower clamping device. Fig. 18, same sheet, is a plan of the selecting device shown in Fig. 17, the rotary disk which carries the selecting-hook being shown in dotted lines and the operating-gears being removed. Fig. 19, same sheet, is a vertical section on the line 19 19 of Fig. 17. Fig. 20, same sheet, is a vertical section on the line 20 20 of Fig. 18. Fig. 21, Sheet 15, is a perspective view of the reed-holding frame with its parts in position to receive the reed. Fig. 22, same sheet, is an enlarged cross-section of the reed-holding frame, showing the reed, also in section, in place therein. Fig. 23, same sheet, is a sectional detail of the locking device of the reed-holder. Fig. 24, Sheet 7, is an enlarged horizontal section on the line 24 24 of Fig. 9. Fig. 25, Sheet 12, is a perspective view of a portion of the two heddles. Fig. 26, Sheet 4, is an enlarged section of one of the heddle-supporting rods and the heddle-adjusting device connected therewith. Fig. 27, same sheet, is a perspective view of one of the heddle-hangers with part of its supporting-rod. Fig. 28, Sheet 2, is a perspective view of a portion of the upper warp-thread-clamping device, its supporting-rod, and mechanism for adjusting the said clamping device in the direction of its length. Fig. 29, same sheet, is a perspective view of a portion of the lower warp-thread-clamping device, together with its supporting-rod and adjusting mechanism. Fig. 30, Sheet 12, is an enlarged section of a portion of the needle-traversing mechanism on the line 30 30 of Fig. 7. Fig. 31, same sheet, is a horizontal section on the line 31 31 of Fig. 30. Fig. 32, Sheet 8, is a detail representing a portion of one of the platforms upon which the heddle-eye-separating devices are mounted. Fig. 33, Sheet 11, is a vertical section on the line 33 33 of Fig. 10. Fig. 34, Sheet 13, is a sectional detail of the warp-thread-selecting hook and the nippers which co-operate therewith. Fig. 35, same sheet, is an enlarged vertical section on the line 35 35 of Fig. 7. Fig. 36, Sheet 12, is a detail in perspective to be hereinafter referred to. Fig. 37, Sheet 2, is a sectional detail illustrating the method of connecting one of the warp-thread-clamping bars with its supporting-rod. Fig. 38 is a view of one of the hangers used for supporting the central portion of the upper heddle-bar; Figs. 39 and 40, details illustrating the construction of the half-nut and its operating mechanism by which the feed-screw is connected with and disconnected from the traversing carriage; Figs. 41, 42, and 43, details to be referred to.

The frame-work of the machine may be of any suitable construction, and in the present instance consist of a bed A, which is supported on suitable legs and is provided with guides, to which is adapted a traversing carriage or slide B, which is fed from right to left by means of a feed-screw C, driven from the main or driving shaft D of the machine through the medium of the gears $b$ $c$ $d$, shaft $e$, bevel-gear $f$, bevel-pinion $g$, shaft $h$, worm $i$, and worm-wheel $k$, as seen particularly in Figs. 5 and 6. The shaft D is provided with the ordinary fast and loose pulleys, as shown in Figs. 1, 3, 4, 5, and 6. The carriage B has a half-nut E, Figs. 4, 39, and 40, which engages with the screw-shaft C; but this nut can be released from the control of the screw, as in the former machines, when it is desired to stop the movement of the carriage, the nut being provided with a slide 195, acted upon by a crank-pin, cam, or eccentric 196, Fig. 40, having the operating shaft and handle 1 to cause the nut to engage with or be released from the control of the screw. When the nut is released from the screw, the carriage can be traversed by means of the hand-wheel F, as in the former machines, this wheel being connected through the medium of a train of gears with a worm-wheel $m$, which is in constant engagement with the feed-screw C.

Between vertical end pieces or standards $n$ $n$, rising from the bed A, are secured four horizontal tubular rods $p$, upon which slide the hangers G, Figs. 1, 2, 3, 4, 5, and 27, which support the heddles H I, the end portions of the upper and lower bars of the said heddles fitting within rectangular eyes or yokes $q$ at the ends of said hangers, the upper yokes each having a sharp central projection $r$ at the bottom, (see Fig. 27,) which slightly indents the heddle-bar and prevents it from sliding within the yoke after the latter has been slipped thereover. The upper and lower hangers G at the right-hand end of the machine are made adjustable longitudinally upon the supporting-rods $p$ by means of screw-shafts $s$, fitting within the tubular rods $p$ and each provided with a hand-wheel $t$ at its outer end. Each of the shafts $s$ engages with a nut $u$, Fig. 26, which slides within the tubular rod $p$ and projects through a longitudinal slot or keyway 50 therein, outside of which it has secured to it a bar $v$, fitting within a groove or guideway in the hanger. The hanger is coupled to the bar $v$ by means of a set-screw $w$, provided with a suitable thumb-piece and adapted to engage with small holes in the bottom of the bar $v$, and when the hangers are in this manner connected with the screw-nuts $u$ of the upper and lower tubular rods $p$ they can be moved simultaneously or independently of each other along the said rods, and the heddle-frame can thus be adjusted in the direction of its length with the greatest nicety. When it is desired to remove the heddle, the set-screws $w$ are loosened to uncouple the hangers G from the bars $v$, when they are free to be slid along the rods $p$ until the eyes or yokes $q$ have cleared the ends of the heddle-bars. The hanger G, used to support the central portion of the upper heddle-bar, instead of being provided with an eye, as shown in Fig. 27, is constructed at its lower end to extend down on one side only of the said bar and is provided with an upwardly-projecting spur 200, as seen in Fig. 38, which slightly indents the heddle-bar and prevents it from slipping thereon, this spur being readily introduced between the heddle-cords, with which it in no wise interferes. The stem of the upper heddle-frame-supporting yoke $q$ is threaded and passes up into the hanger, as seen in Fig. 27, which is provided with a recess, within which is fitted a thumb-nut 51, which serves to raise and lower the yoke $q$, whereby the upper and lower bars of the heddle can be separated to take up the slack of the heddle-cords or released when the said cords are to be slackened.

To the standards $n$ $n$ are bolted two brackets J J, which form the end pieces of the frame K, which supports the reed L. This frame, which is shown enlarged in Figs. 21, 22, and 23, consists, essentially, of two horizontal rods 52 53, upon the lower one 53 of which is firmly secured a long socket-plate 54, of U shape in cross-section, within which rests the lower bar of the reed L. A similar socket-plate 55 is hung by means of short sleeves 56 to the upper rod 52, so as to swing freely outward therefrom, the upper socket-plate 55 being adapted to fit over the upper bar of the reed when swung inward immediately over the rod 53. On the inner edge of the socket-plate 55 is a series of fingers or projections 57, Figs. 2, 4, and 22, which are adapted to catch over the top bar of the reed and guide it into the socket-plate 55 as the latter is swung inward by means of its handle 58, which projects upward from the central sleeve 56. Within this handle is placed a spring-actuated rod 59, the lower end of which enters a recess in the rod 52 as soon as the upper socket has been rocked into a position to hold the reed, thus locking the latter in place, a knob on the top of the spring-actuated catch enabling it to be seized by the fingers when it is to be lifted up to release the upper socket-plate, which can then be swung outward to allow of the removal of the reed. This swinging movement of the upper socket plate or holder permits the top of the reed to be readily swung out to disengage it from the reed-dent separator M. This separator, which is driven through the medium of suitable gearing to be hereinafter described, comprises, simply, a disk with overlapping ends forming a section of a screw-thread. One of the flanges is thickened or expanded laterally, so that when it is inserted between two of the dents of the reed it will spread the said dents apart and facilitate the passage of the reciprocating needle, to be hereinafter described, through the dents of the reed. The flange of the separator acts as a screw-thread, the forward end of the flange entering space after space between the dents of the reed in succession, the dents being thus separated, so as to be out of the way of the needle.

The construction of the reed-dent separator is fully described and claimed in Patent No. 363,689, dated May 24, 1887, and forms no part of this invention, the illustration and description being introduced merely as a part of the general illustration and description of the machine.

On the driving-shaft D is a bevel-wheel $a'$, arranged by means of a key or feather and groove to slide on but turn with the said shaft. The bevel-wheel $a'$ gears with another bevel-wheel $b'$ on a short vertical shaft $c'$ on the carriage B, which is connected, through the medium of the bevel-gears $d'$ $e'$, with a horizontal shaft $f'$ on the carriage, arranged at right angles to the shaft D and connected at one end, through the medium of bevel-gears $g'$ $h'$ $i'$ $k'$ $l'$ $m'$ and shafts $n'$ $p'$, with a vertical shaft N, (see Fig. 6,) which latter drives the mechanism for selecting the warp-threads, which will be fully described hereinafter. The opposite end of the shaft $f'$ is geared by means of bevel-gears $q'$ $r'$ $s'$ to an inclined shaft $t'$, which is geared at its opposite end by means of bevel-gears $u'$ $v'$ to a shaft $w'$, having its bearings in one side of a box or casing P, secured to the front of the carriage B and adapted to contain the mechanism for operating the reciprocating warp-drawing needle Q, which will now be described. The needle Q, which is a flat steel bar pointed at its front end and barbed, as at 60, Figs. 12 and 15, reciprocates in a tubular casing $a^2$ on the upper side of the box P, and is attached at its rear end to a carrier $b^2$, which slides in a dovetail guideway between parallel bars $c^2$ on the top of the box P, as seen in Figs. 7 and 30, the needle as it is traversed sliding through a stationary guide $d^2$ at the inner end of the tubular casing $a^2$. To the under side of the carrier $b^2$ is pivoted a tubular rod $e^2$, which is adapted to slide within guides $f^2$ at the upper and lower ends of a lever R, Figs. 7 and 30, pivoted to the bottom of the casing P at 61. The lever R consists of two parallel bars, between which is fitted a slide $g^2$, to which is pivoted the outer end of a crank-arm $h^2$, which is fastened to the end of the shaft $w'$, which latter is driven from the main shaft D through the medium of the gears and shafts above described and shown particularly in Fig. 6. The crank-arm $h^2$ as it rotates oscillates the lever R, causing the needle Q to advance and recede, the tube $e^2$ sliding up and down within the guides $f^2$. Within the tubular rod $e^2$ is placed a light spiral spring $i^2$, Fig. 30, upon which rests a sliding rod $j^2$, having a transverse pin $k^2$, Figs. 30 and 31, which projects through slots $l^2$ in the tube $e^2$ and is brought into contact with the upper guide $f^2$ as the tube $e^2$ slides upward, whereby the spring $i^2$ is compressed just before the needle reaches the end of its forward or backward stroke, which renders the operation of the parts smooth and easy and avoids any sudden shock which might be caused by the sudden reversing of the direction of motion of the parts. On the return movement of the needle the upper end of the rod $e^2$, where it is pivoted to the carrier, is brought up against a buffer $m^2$ at the upper end of a spring $n^2$, as seen in Fig. 7, thus still further lessening any shock which might occur at the termination of the backward stroke of the needle-carrier.

I will now describe the mechanism for separating the heddle-cords and holding them with their eyes in the path of the reciprocating needle Q in such manner that the passage of the latter through the heddle-eyes will be insured, reference being had particularly to Figs. 7, 8, 9, 10, 11, 12, 13, 14, 31, 32, and 33.

The operation to be effected is the same as in the machines described in the former patents referred to—that is to say, the needle passes first through the reed L, then through an eye of the heddle H, then between two eyes of the heddle I, and after receiving a warp-thread $p^2$ draws it between the two eyes of the heddle I, through the eye of the heddle H, and through the reed; but on the next stroke the needle passes between two eyes of the heddle H and through an eye of the heddle I, and, receiving another warp-thread $p^2$, draws it through the eye of the heddle I, between the two eyes of the heddle H, through the reed, and so on until all the warp-threads have been drawn through the heddle-eyes and the reed. The number of threads which pass through each space between the dents of the reed corresponds to the number of heddles being threaded in the machine. The eyes of each heddle are selected and separated one by one in proper order and held in position for the passage of the hooked needle Q in the following manner, and as the eye-separating mechanism for the heddle H is precisely like that for the heddle I, the two mechanisms being so connected with the power that the heddles are acted upon alternately, I will describe only the device for acting on one heddle, which will apply equally to the device for acting upon the other heddle.

S S' are two plates or platforms, which are supported on posts or standards T, rising from the carriage B, and between these two plates is a narrow space or channel $q^2$, through which the heddle-cords pass as the carriage with the plates S S' is traversed from one end of the machine to the other, this space $q^2$ being narrowed down toward the rear end, as seen in Fig. 10, to a width just sufficient to allow the passage of one of the eyes of the heddle-cords when said eye is turned edgewise so as to face toward the front of the machine. At the rear end of each of the plates S S' are two small projecting plates $r^2$ $s^2$, forming jaws flush, respectively, with its upper and lower surfaces, the space between the pair of both the upper and lower jaws being just sufficient to hold a heddle-eye with its lower and upper knots fitting, respectively, close up under the plates $s^2$ and down upon the upper plates $r^2$, as seen in Fig. 32, the distance between the two jaws of a pair being sufficient to allow the passage of a heddle-eye turned edgewise, so as to present a single thickness of the cord only. The thickness of the platforms S S' corresponds to the length of the heddle-eye, and in the narrow part of the channel $q^2$ on each side are formed on the edges of said platforms two inclines or shoulders 62, (see Fig. 32,) against which the upper or lower knot of the heddle-eye will strike if the said eye should happen to be a little too high or too low, by which means the eye is carried downward or upward to the proper level to insure its upper and lower knots passing, respectively, over onto the upper surfaces of the plates $r^2$ $r^2$ and just under the lower surfaces of the plates $s^2$ $s^2$, as seen dotted in Fig. 32, with the face of the eye presented toward the front of the machine and directly in the path of the reciprocating needle Q, which as it advances is held closely up against the vertical end faces 63 of the platforms S S'. At the corner of the platform S which is nearest to the front of the machine is a guide U, Figs. 7, 8, and 12, through which the needle passes, the said guide being provided with a downwardly-extending and inwardly-inclined flange $t^2$, which serves to catch the point of the needle in case it should have become accidentally sprung outward and carry it in snugly against the end face of the platform, and to still further insure the needle passing through the heddle-eye held between the jaws $r^2$ $s^2$, the upper and lower jaws which lie nearest to the front of the machine are chamfered off, the upper jaw inward, as seen at 65, and the lower jaw upward, as seen at 64, Figs. 11 and 12, whereby the point of the needle is caused to lie closely against the end face of the platform at this point and is kept exactly in line with the heddle-eye through which it is about to pass.

W W' are two holdback-fingers, which are secured to the upper ends of two shafts $u^2$ $v^2$ and lie one immediately over the other, the finger W overlapping the finger W', as shown. These fingers have a swinging movement in a horizontal plane and serve to alternately hold back and release the front and back rows of cords of the heddle. Each of the shafts of the holdback-fingers is provided at its lower end with a small gear $w^2$, Fig. 24, which meshes with a rack $a^3$ on a slide $b^3$, which is actuated in one direction by a cam 66 on a horizontal shaft $c^3$, the shafts of the holdback-fingers being moved in the opposite direction by spiral springs $d^3$ surrounding the same, each of said springs being connected at one end with its shaft by a clutch $e^3$, whereby it can be tightened up when required, the upper end of the spring being inserted within a hole in the under side of the plate S or S'. This clutch $e^3$, Figs. 11 and 43, which is of well-known construction, consists of two toothed collars adapted to engage with each other, one of said collars being immovably secured by a set-screw or otherwise to the vertical shaft of the holdback-finger, while the other or upper collar has secured to it the end of the spring $d^3$ and is adapted when disengaged from the lower collar to be rotated upon the shaft of the holdback-finger to wind up and tighten the said spring, after which it is again engaged with the lower collar to maintain the spring at the desired tension. The short horizontal shaft $c^3$ has secured to it a gear $f^3$, which meshes with a gear $g^3$ on a horizontal shaft A', Figs. 6, 7, 8, and 9, which carries at one end a bevel-gear $h^3$, which meshes with a bevel-gear $i^3$ on a short vertical shaft $k^3$, the latter carrying at its lower end a bevel-gear $l^3$, which meshes with a bevel-gear $m^3$, arranged by means of a key or feather and groove to slide upon but to turn with the shaft $e$ as the carriage B is traversed, as shown in Fig. 6. The holdback-fingers W W', which operate alternately, enter between the front and back rows of cords of the heddle, and while one finger is holding back the cords on one side the other finger is thrown back by its spring, as seen in Figs. 12 and 13, thus releasing the cords on that side of the heddle, when the cords of the first eye will separate from the rest, the remaining cords on that side being prevented from following by reason of the crossing of the front and back cords beneath the eyes. It will be observed that the holdback-fingers as they are swung inward lap each other, which enables them to be made of such length that their rounded hook-shaped outer ends will extend beyond a line or plane passing centrally between the front and back rows of heddle-cords, thus increasing their range of motion, which, together with the width and shape of the outer ends or points of the fingers, cause the front and back rows of cords to be so widely separated thereby, as seen in Fig. 11, which represents them in the first position, that while one finger is holding back the cords on one side the other finger as it swings inward, which takes place before the other finger is released, cannot by any possibility catch any of the cords on the opposite side of the heddle. This arrangement of the fingers in planes one above the other, so that they may lap or swing past each other, as described, I consider a novel and important feature of my invention, as it enables these fingers to operate to the greatest possible advantage without any liability of improperly catching or disarranging the heddle-cords.

At the rear end of each of the platforms S S' is formed a slot $n^3$, and in these two slots are fitted two slides $p^3$ $q^3$, one on each side of the channel $q^2$, the two slides being connected together, so as to move simultaneously, by means of a long vertical U-shaped yoke B', as seen in Figs. 7, 11, 12, and 13, which passes around under the heddle, so as not to interfere therewith as the platforms S S' are traversed with the carriage B. The slides $p^3$ $q^3$ thus coupled together are reciprocated in their slots $n^3$ by a lever $r^3$, connected with a lug or plate attached to the slide $p^3$ and pivoted at its lower end, said lever having an arm 67, Figs. 8 and 9, at the outer end of which is an anti-friction roll, which fits within a cam-groove in the periphery of a disk $S^3$ on the shaft A'. Upon the upper side of the slide $p^3$, which is nearest the front of the machine, is secured a wedge-shaped plate or block 68, against the inner inclined side of which rests a pawl-shaped finger 69, pivoted to the slide $q^3$ of the platform S'. Against the outside of this finger 69, a short distance from its point, rests the point of a pawl-shaped finger 70, pivoted to the slide $p^3$ at the rear of the wedge-shaped block 68 and having a spring 71, which keeps it in contact with the finger 69 and presses the latter against the inclined side of the block 68. Outside the fingers 69 and 70 is another curved pawl-shaped finger 72, which is pivoted to slide $q^3$ and is acted upon by a spring 73, which presses its point against the finger 70 and its inner side at 74 against the finger 69. This mechanism is exactly duplicated on the under side of the platforms S S', the wedge-shaped block and pawl-shaped fingers secured to the under side of the slides $p^3$ $q^3$ being arranged directly in line with those on the upper side of the said slides. In each of the platforms S S' is formed a diagonal guide-slot 75, Figs. 12, 13, and 33, in which is fitted a slide 76, Fig. 33, to which is secured a plate 77, carrying at its outer upwardly-bent end a small brush 78. To the plate 77 is pivoted a link 79, to which is pivoted a crank-arm 80 on the vertical shaft of the heddle holdback-finger, and as the latter is swung outward to release the heddle-cords the brush is caused to advance, and, coming into contact with the heddle-cords just released, brushes or switches them over into place in case they should stick or have become accidentally obstructed in any way, so as not to move freely into place when released by the holdback-finger.

The operation of the above-described mechanism is as follows, and as the action of the fingers 69, 70, and 72 on the heddle-cords is the same on the lower as on the upper side of the platforms S S', I will describe the action of the upper fingers 69, 70, and 72, which will apply to those on the under side as well. The parts being in the position seen in Fig. 11, which shows the heddle-cords in the first position, and the line of back heddle-cords being held out of the way by the finger W', the finger W is thrown back by its spring into the position seen in Figs. 12 and 13. This releases the front row of heddle-cords, when the cords of the foremost eye of this row will separate from the rest and pass into contact with the front side of the finger 69, as shown at the right-hand side of Fig. 12, which I term the "second position," the brush 78, which advances at this moment, serving to switch or brush the cords over into place in case they should stick or from any other cause fail to move. A flattened thin-edged bar $t^3$, Figs. 11, 12, 13, and 25, is introduced longitudinally between the cords of the heddles, and is suspended in any suitable manner—for instance, by means of wires—at such a height as to bring it directly under the eyes of the heddle at a short distance therefrom, the friction of the heddle-cords against this bar, in connection with the crossing of the front and rear cords, causing the cords of the foremost eye in the line to be separated from the following ones on their release by the holdback-finger and preventing the cords of two or more eyes from passing at the same time inside the point of the block 68. As soon as the heddle-cords have passed into the second position in contact with the front side of the finger 69 the slides $p^3$ $q^3$ commence to move in the direction of the arrow 45, when the cords will pass the point of the finger 69 and enter the space 81, assuming what I term the "third position," as shown in Fig. 13. The next movement of the slides in the contrary direction will cause the cords to pass between the point of the finger 70 and the finger 69 into the space 82 and between the fingers 69 and 72, by which they are held firmly at the point 74, the heddle-cords having been by this movement advanced into a position to bring the heddle-eye squarely between the jaws $r^2$ $s^2$, as shown at the left-hand side of Fig. 12, which I term the "fourth position," where they will remain until the needle Q has passed through the eye, received a warp-thread, and has drawn the said thread back through the said eye. The next movement of the slides $p^3$ $q^3$ in the direction of the arrow 45 causes the threaded heddle-eye to pass out between the point of the finger 72 and the finger 70, and on the return movement of the slides the threaded eye is pushed out from between the jaws and out of the path of the needle by the pressure of the curved outer side of the finger 72 into the fifth and last position, as shown at the right-hand side of Fig. 12. When the machine is arranged for threading two heddles, as in the present instance, the eyes of the rear heddles are all held out of the path of the needle while a single eye of the front heddle is being threaded, and the eyes of the front heddle are then held out of the way while an eye of the rear heddle is being threaded, these alternate actions being continued until all the eyes of both heddles are threaded. As soon as an eye of the front row or series of cords of the heddle H has been carried into position between the jaws $r^2$ $s^2$ and while the needle is passing through said eye the front row or series of cords of the other heddle I is released by the outward movement of its holdback-finger W and the cords of the foremost eye of this series are carried between the inclined block 68 and the finger 69 of the separating device, which acts upon this heddle, and by the time that the eye of the heddle H has been threaded and pushed out of the jaws $r^2$ $s^2$ the eye of the heddle I has arrived into position between the jaws $r^2$ $s^2$ of its separating device ready for the passage of the needle therethrough, and while the eye of the heddle I is being threaded the separating device of the heddle H remains stationary, with both holdback-fingers W W' carried inward to hold back both series of cords, and as soon as the thread has been drawn through the eye of the heddle I and said eye has been pushed out from between the jaws $r^2$ $s^2$, as seen in Fig. 12, and while the needle is being drawn back to carry the said thread through the reed the holdback-finger W' of the heddle H releases the back series of cords of said heddle, the cords of the foremost eye of which are then carried by the action of the pawl-shaped fingers between the jaws $r^2$ $s^2$, as previously described, and while this is taking place the separating device of the heddle I remains stationary, with its holdback-fingers W W' holding back both series of cords of said heddle I in the position shown in Fig. 11, and in this manner the two separating devices operate alternately, a front eye of the heddle H being first acted upon and threaded, then a front eye of the heddle I, then a back eye of the heddle H, and finally a back eye of the heddle I, these operations being repeated until the eyes of all the cords have been threaded. Where three, four, or more heddles are to be threaded in one machine, the eyes of all but one heddle must be held back during the threading of the eye of that heddle, as will be readily understood; but this will require merely a duplication of the separating devices and a proper timing of the mechanism which operates the same.

The reed-dent separator M is driven from the shaft A', Figs. 4, 6, 7, and 8, which carries at one end a segment-gear $u^3$, Figs. 7, 8, and 36, engaging with a pinion $w^3$ on a short horizontal shaft 83, so as to impart thereto an intermittent movement and lock it between such movements. This locking is effected by a plate 205, secured to the end of the shaft 83 and having its lower edge curved to correspond to the shape of the flange 206 of the segment-gear $u^3$, against which it lies closely, as seen in Figs. 36 and 41, thus locking the shaft 83 and preventing it from rotating until a space or opening 207, Figs. 41 and 42, is brought by the rotation of the gear $u^3$ around under the plate 205, as seen in Fig. 41, at which time the teeth of the segment-gear $u^3$ commence to engage with the pinion $w^3$. The plate 205 is now free to rotate in the notch or space 207, and during the time that the teeth of the gear $u^3$ are acting on the pinion $w^3$ the said plate 205 makes an entire revolution, whereby its lower curved end is again brought down upon the flange 206 to lock the shaft 83 and prevent it from rotating, except when the pinion $w^3$ is being acted upon by the teeth of the segment-gear $u^3$. The opposite end of the shaft 83 carries a bevel-wheel 84, which gears into a bevel-wheel 85 on a horizontal shaft 86, which passes through the box P and carries at its opposite end a bevel-wheel 87, Figs. 1 and 6, which gears into a bevel-wheel 88 on a vertical shaft 89, carrying at its upper end a bevel-wheel 90, which gears into a bevel-wheel 91 on a short horizontal shaft 92, supported in a long bearing on a bracket $x$, Fig. 8, said shaft carrying at its opposite end a bevel-wheel 93, which gears into a bevel-wheel 94 on a shaft 95, to the outer end of which is secured the reed-separator M, which is thus operated intermittingly at the proper times to separate the dents of the reed, the said separator M making a single revolution immediately after the needle has drawn the required number of warp-threads through a single space between the dents of the reed.

The mechanism by which the warp-threads $p^2$ are successively selected and carried one at a time against the barbed needle Q into a position to insure their being caught by its hook 60 as the needle is retracted, so as to be drawn thereby through the eye of the heddle and between the dents of the reed, is shown particularly in Figs. 6, 7, 8, 9, 15, 16, 17, 18, 19, 20, 34, and 35, and is driven from the vertical shaft N, which receives its motion from the main shaft D through the medium of the gears and shafts previously described. The warp-threads $p^2$ are wound on the warp-beam C', journaled in bearings on a suitable stand on the floor, as seen in Figs. 2, 4, and 5, and said warp-threads pass up over a long guide-bar 96, provided with lugs 160, sliding on a tubular rod 100, secured at its opposite ends to brackets on the standards $n\ n$, said warp-threads being clamped at the top and bottom in a manner similar to that shown in the former patents referred to. The top clamp in this case consists of the long bar 96, Fig. 28, over which is pressed an inverted-U or trough shaped spring-metal clamp 98, the warp-threads being confined between the bar 96 and the spring-clamp 98. The lower clamping device consists of a long stationary flat bar 99, Figs. 15 and 29, and a removable clamping-bar $a^4$, the bar 99 being provided, also, with lugs 160, sliding on another tubular rod 100, also secured at its opposite ends to brackets on the standards $n\ n$. The removable clamping-bar $a^4$ is held tightly in place against the face of the flat bar 99 by removable spring-metal clamps $b^4$, applied to the ends of the clamping-bars, as seen in Figs. 3 and 29, the warp-threads being confined between the two bars. The inner side of the bar 99, which presses against the warp-threads, is covered with felt, cloth, or equivalent material to allow each thread to be easily and independently withdrawn by the needle Q without disturbing any of the adjacent threads, this clamping device being substantially like that shown in Patent No. 255,038. The upper and lower clamping-bars 96 and 99 are each made adjustable longitudinally on its tubular supporting-rod 100 by means of a screw-shaft 155, fitting within said tubular rod and provided with a hand-wheel 156, Figs. 3, 4, and 5, at one end, the rods 100 being similar to the rods $p$, which support the heddle-hangers G. The screw-shaft 155 engages with a nut 157, which slides within the tubular rod 100 and projects through a longitudinal slot or keyway 158 therein, outside of which it is secured to the clamping-bar by a screw 159, as seen in Fig. 37, the connection between the nut and clamping-bar being strengthened by the tubular lug 160, which is secured to said bar and is adapted to slide upon the tubular supporting-rod, these two clamping devices being thus made adjustable longitudinally, whereby provision is made for the nice adjustment of the warp-threads to accord with the reed and heddle.

D' is a standard or frame, which is bolted to the carriage B and carries at its upper end a table E', Figs. 7, 8, 15, 17, 18, 19, 20, and 35, upon which is mounted a rotary disk G', which carries the rotating sliding selecting-hook $c^4$, by means of which the warp-thread is carried against the reciprocating needle Q in a manner to be particularly described hereinafter. To the upper side of the disk G' is secured a gear 102, which is driven through the medium of two intermediate gears 103 104, loose upon their studs, by a gear 105, fast on the upper end of the vertical shaft N, previously described. The table E' is provided with two extensions 106 and 107, Figs. 15 and 20, forming between them a narrow slot $d^4$, and on these extensions are placed two adjustable plates 108 and 109, upon which are secured two narrow plates 110 and 111, the said plates forming a pair of nippers K', with four clamping edges or jaws, the upper ones 110 111 being located just above the level of the selecting-hook $c^4$, while the lower ones 108 109 are located just below the level of the said hook, which as it is rotated passes horizontally between the inner ends of said upper and lower jaws, so as to catch that portion of the warp-thread which is held between said upper and lower jaws, the inner ends of which overlap and underlap the said selecting-hook, as seen in Fig. 34. The plate 109, carrying the narrow plate 111, is made adjustable by means of two screws 112, and is normally adjusted by means of the said screws at such distance from the edge of the plate 108 as to leave a space just sufficient to hold the warp-threads parallel or side by side in a single row and prevent them from riding over each other as the carriage B is fed forward. The plate 108, which forms the movable portion of the nippers K', is connected to a slide 113, moving in a guideway in the table E', and to this slide is pivoted a lever 114, also pivoted at its opposite end to the table E', a projection 115 of this lever 114 being acted upon by a cam-disk 116 on the shaft N, whereby the jaws 108 and 110 are moved toward jaws 109 and 111 at the proper time to clamp and firmly hold the warp-threads at points just above and just below the level of the selecting-hook $c^4$, the slide 113, with the movable jaws, being retracted by a spring 117 (seen dotted in Fig. 18) as soon as the notch in the disk 116 has passed the point of the projection on the lever 114. Upon a post 118, rising from the table E' and passing through a slot in the plate 109, is pivoted, by means of a clamping-screw 119, an arm 120, from which projects a horizontal guide-rod $e^4$, against which the foremost warp-thread rests, and along which it is drawn by the selecting-hook $c^4$, at an angle, tightly against the under side of the front end of the reciprocating needle, which is at that time in the position shown in Figs. 15 and 18, the tension of the thread and the angle at which it is held insuring its entrance into the hook 60 of the needle Q as the latter is retracted.

Beneath the nippers K' are a pair of horizontal nippers H', which have a vertical movement toward and from the nippers K' and are alternately opened and closed, so as to take up any slack in the warp-threads as they are presented to the selecting mechanism. The jaws 121 and 122 of these nippers H' are both mounted on a slide 123, moving in vertical guideways on a side extension of the standard D', said jaws being pivoted at 124 125 and connected by a link 126, Fig. 16, whereby the motion of one is communicated to the other to cause them to move simultaneously in opposite directions. The slide 123 is moved by a cam 127 on a short shaft 128, to which is secured a bevel-wheel 129, which meshes with a bevel-wheel 130 on the shaft N, (see Figs. 16 and 35,) said cam acting on an anti-friction roll at the lower end of an arm 131, projecting down from the slide 123, a spring 132 serving to retract the slide after it has been raised by the cam 127.

The nippers H' are opened against the influence of a spring 133, Fig. 16, by a wing or plate 134, projecting from a vertical rod 135, passing up between the nippers and supported at its opposite ends in suitable bearings 136, Figs. 7, 9, and 15. This rod 135 is partially rotated on its axis to cause the wing 134 to act upon and open the nippers by a cam 137 on the short shaft 128, which is brought in contact with a pin 138 on the shaft 135, and as soon as this pin drops off the projection of the cam the rod is returned to its normal position by a spiral spring 139, which encircles said rod. These nippers perform the same function as those described in Patents No. 255,038 and No. 355,221—that is, they stretch and take up any slack in the warp-threads before the latter are presented to the selecting device. The novel feature, however, of this portion of my invention consists in the co-operation, with the lower nippers H', of the upper pair of nippers K', with their four clamping-jaws, which, after the lower nippers H' have drawn down and stretched the warp-threads, are brought together for the purpose of clamping the warp-threads just above and just below the level of the selecting-hook $c^4$, which hook passes, as before stated, between the upper and lower pairs of clamping-jaws of said nippers, and by thus causing the warp-threads to be clamped between two pair of jaws placed a short distance apart, one above the other below the level of the warp-thread-selecting hook, the liability of the warp-threads getting out of a single line is avoided and said threads are held firmly in position while being caught by the said selecting-hook.

The disk G' is made in two pieces held together by screws, the under and smaller portion of which fits and rotates within a circular recess in the table E', the disk rotating upon a stud 140, the head of which rests upon the gear 102, which is securely fastened to the upper surface of the disk. Within a shallow groove in the lower portion of the disk G' is fitted a slide 141, which is provided at one end with a hook-shaped portion forming the warp-thread-selecting hook $c^4$, within which is formed an eye or aperture 142, open on its outer side, said opening being closed by a light spring 143, the free end of which extends beyond the eye and lies against the edge of the hook $c^4$ in such a manner as to permit the entrance of a single thread only at a time into the eye 142 as the hook $c^4$ is carried by the rotation of the disk G' past the line of warp-threads clamped between the upper and lower jaws 108 109 110 111 of the upper nippers K'. The selecting-hook $c^4$ is forced out beyond the periphery of the disk G' by a light curved spring 144, and at the end of the slide opposite to the hook $c^4$ is a pin 145, which projects up through a slot in the disk and during a portion of the rotation of said disk rides over the edge of a cam-plate 146, by which means the plate 141 is retracted against the influence of the spring 144. When, however, the angular point of the hook $c^4$ reaches the warp-threads, the pin 145 rides down an incline 147 at the end of the cam-plate 146, which permits the slide 141 to be forced outward by the spring 144, causing the inclined side 148 of the hook $c^4$ to bear against the foremost warp-thread, producing a tension thereon, which thus insures the thread passing into the eye of the said selecting-hook. The single thread thus selected and separated from the series is then carried by the selecting-hook along the guide-rod $e^4$ and against the lower edge of the needle Q, which has by this time completed its outward movement, and into a position, as before described, to insure its being caught by the hook or barb 60 of the needle Q, as seen in Figs. 15 and 17, which as it is retracted carries the thread back through the eye of the heddle and through the reed. Just before the reciprocating needle Q commences to draw back the warp-thread both the upper and lower pairs of nippers are opened to release the warp-threads and allow the one within the hook or barb of the needle Q to be drawn freely back by the said needle without any obstruction. After the thread has been drawn through the reed it is caught and drawn out from the hook of the needle by a rotating arm or finger $g^4$, which is secured to a shaft $h^4$, at the opposite end of which is a bevel-wheel $i^4$, which meshes with a bevel-wheel $k^4$ on a vertical shaft $l^4$, having at its lower end a bevel-wheel $m^4$, which meshes with a bevel-wheel $n^4$ on a horizontal shaft $p^4$, passing through the box P and carrying at its opposite end the gear $r'$, previously referred to, which meshes with the gear $q'$ on the shaft $f'$, the latter being driven from the main shaft D, as previously described, through the medium of the gears and shafts referred to in the first part of the specification and shown particularly in Fig. 6. This finger $g^4$, which makes one complete revolution while the needle is being advanced and retracted, is caused to perform its work of drawing the thread out of the eye of the needle and casting it to one side when the point of the latter has been drawn back out of the path of the finger, so that the finger will clear the needle as it rotates, this device being similar to that described in the former patents referred to.

What I claim as my invention, and desire to secure by Letters Patent, is—

1. In a warp-drawing-in machine, the combination of the heddle-support, the traversing carriage, the platforms supported by and moving with the traversing carriage and having a space or channel between them for the passage of the heddle-cords, the slides moving in ways upon opposite sides of said space or channel and coupled together to move simultaneously, as described, the heddle-eye-separating fingers and wedge-shaped block mounted on said slides, reciprocating devices for said eye-separating fingers and block, and the eye-holding jaws projecting from said platforms at the end of the space or channel between the same, substantially as described.

2. In a warp-drawing-in machine, the combination, with the heddle support or holder, the traversing carriage, and a reciprocating warp-drawing needle mounted upon said traversing carriage, of two platforms connected to and moving with the carriage and having a space or channel between them for the passage of the heddle-cords, jaws projecting from said platforms at the end of said space for holding the heddle-eye in the path of the needle, the slides with their spring-actuated fingers and wedge-shaped block moving in guides on opposite sides of said space or channel and coupled together, as described, and means for reciprocating said slides, whereby the heddle-eye is carried into the jaws and held in the path of the drawing-in needle, substantially as described.

3. In a warp-drawing-in machine, the combination, with the heddle support or holder and the two platforms having a space between them for the passage of the heddle-cords and provided at their ends with the eye-holding jaws, of the slides coupled together by a yoke adapted to extend under the heddle, said slides moving in slots on opposite sides of said space or channel and carrying on each of their upper and lower sides a wedge-shaped block and a series of spring-actuated fingers co-operating therewith, and means for reciprocating the slides, whereby the heddle-eye is carried into the holding-jaws, held therein during the passage of the needle, and forced out therefrom after being threaded, substantially as set forth.

4. In a warp-drawing-in machine, the combination, with the platforms S S' and the warp-drawing-in needle, of the guide U, with its flange $t^2$, and the jaws $r^2$ $s^2$, with their inward and upward inclines 64 and 65, whereby the point of the drawing-needle is kept closely against the ends of the platforms and in line with the eye of the heddle within the jaws $r^2$ $s^2$, substantially as set forth.

5. In a warp-drawing-in machine, the combination, with the two platforms and their reciprocating slides carrying the eye-separating devices of the jaws $r^2$ $s^2$, located at the end of the space between said platforms and adapted to fit, respectively, under the upper knot and over the lower knot of the heddle-eye and to hold said eye with its face or broader side presented toward the front of the machine, substantially as set forth.

6. In a warp-drawing-in machine, the platforms S S', having jaws $r^2$ $s^2$ and provided at their edges, in the narrow portion of the space $q^2$ between the same, with inclines or shoulders 62, adapted to contact with the knots of the heddle-eye, whereby the said eye in its passage through the space $q^2$ is guided to the level of the jaws $r^2$ $s^2$, projecting from said platforms at the end of the space $q^2$, substantially as set forth.

7. In a warp-drawing-in machine, the combination, with the heddle-support and the platforms having a space or channel between them, of the slides moving in guides on opposite sides of the space between said platforms and coupled together by a U-shaped yoke extending around under the heddle, the reciprocating heddle-eye-separating devices mounted on said slides, and means for reciprocating the slides, substantially as set forth.

8. In a warp-drawing-in machine, the combination, with the platforms S S', having between them the space $q^2$, of the slides $p^3$ $q^3$, moving in guides on opposite sides of the space $q^2$ and connected together by a U-shaped yoke B', the wedge-shaped blocks 68, pawl-shaped spring-actuated fingers 69 70 72, the eye-holding jaws $r^2$ $s^2$, the lever $r^3$, attached to one of the said slides, and means for actuating the lever $r^3$, all substantially as described.

9. In a warp-drawing-in machine, the combination, with a heddle support or holder, of the vertical shafts $u^2$ $v^2$ and the horizontal swinging holdback-fingers W W', mounted upon said vertical shafts and located one above the other and adapted to lap and swing past each other, said fingers having rounded hook-shaped ends extending when swung inward beyond a line or vertical plane passing centrally between the front and back rows of heddle-cords, whereby said rows of cords are so widely separated that the holdback-finger on one side cannot catch any of the cords of the opposite row, substantially as set forth.

10. In a warp-drawing-in machine, the combination, with the heddle support or holder, of the horizontally-swinging holdback-fingers with their operative mechanism, said fingers being located one above the other and adapted to lap and swing past each other, as described, the plates or platforms having a space between the same, and jaws at the end of said space to hold the heddle-eye, the slides moving in guides on opposite sides of the space between said platforms, and the eye separating and holding devices consisting of the spring-actuated pawl-shaped fingers and wedge-shaped blocks mounted on said slides, and means for reciprocating the slides, all operating substantially as set forth.

11. In a warp-drawing-in machine, the combination, with the heddle-cord holdback-fingers and the reciprocating eye-separating devices, of a reciprocating slide or carrier and a brush mounted on said slide or carrier and adapted to carry the heddle-eye when released into a position to be acted upon by the reciprocating eye-separating fingers, substantially as described.

12. In a warp-drawing-in machine, the combination, with the platforms S S', with their jaws $r^2 s^2$, and reciprocating eye-separating devices, as described, and the horizontally-swinging holdback-fingers W W', of the slides or carriers moving in diagonal guides in said platforms, and the two brushes 78, mounted on said slides or carriers, and mechanism for reciprocating said brush-carriers, all substantially as described.

13. In a warp-drawing-in machine, the combination, with a warp-drawing-in needle, of a horizontally-rotating disk a slide moving horizontally in said disk and carrying at its outer end a warp-thread-selecting hook having an inclined face and an eye covered by a light spring, and means for projecting the slide to cause the selecting-hook to take a single warp-thread and afterward retracting said slide, substantially as described.

14. In a warp-drawing-in machine, the combination, with the warp-drawing-in needle, of the rotating disk and its operative mechanism, the selecting-hook with its carrying-slide moving horizontally in said disk, a spring for projecting said hook beyond the periphery of the disk to cause its inclined face to bear against the warp-thread, a cam for retracting the slide and selecting-hook, and the guide-rod $e^4$, whereby the selected thread is brought against the lower edge of the warp-drawing-in needle as the selecting-hook is rotated, substantially as described.

15. In a warp-drawing-in machine, the combination of the warp-drawing-in needle, the rotating disk G', the slide 141, carrying at one end the selecting-hook $c^4$, having an inclined side 148 and an eye or aperture 142, closed on one side by a light spring 143, the spring 144, the cam-plate 146, adapted to act upon a pin 145, projecting from the slide 141, and the guide-rod $e^4$, all operating substantially as set forth.

16. In a warp-drawing-in machine, the combination, with the warp-thread-selecting hook, of a pair of clamping-jaws located above the level of the warp-thread-selecting hook and acting in a horizontal plane only, said jaws being adapted to clamp and hold the warp-threads tightly in position close to the point at which they are taken by the selecting-hook, and means for operating said clamping-jaws, substantially as set forth.

17. In a warp-drawing-in machine, the combination, with the warp-thread-selecting hook, of a pair of nippers provided with an upper and lower pair of clamping edges or jaws, the former located above and the latter below the path of the selecting-hook, which passes horizontally between the inner ends of the said upper and lower jaws, whereby the warp-threads are held tightly in position immediately above and below the path of the selecting-hook at the time the latter is taking a thread, and means for operating said clamping-jaws, substantially as set forth.

18. In a warp-drawing-in machine, the table E', provided with two extensions 106 107, having the adjustable nippers K', the slide 113, carrying the movable jaw, the lever 114, pivoted to the slide, and a cam for operating said slide, combined with the rotating disk G' and its sliding selecting-hook $c^4$, and means for operating the disk and hook and the nippers, substantially as set forth.

19. In a warp-drawing-in machine, the combination of the rotating and horizontally-sliding warp-thread-selecting hook and its carrier, and means for operating the same, the lower pair of nippers H', having a vertically-reciprocating movement, as described, and the upper pair of nippers K', adapted to clamp and hold the warp-threads at points immediately above and below the path of the selecting-hook, and means for operating the nippers, substantially as set forth.

20. In a warp-drawing-in machine, the combination, with the upper clamping-nippers, and the rotating and horizontally-sliding warp-thread-selecting hook, and means for operating the same, of the standard D', the slide 123, moving in vertical guideways on said standard D', the lower horizontal nippers H', connected by a link and pivoted to said slide 123, a spring 133 for closing said nippers, a vertical rod 135, having a wing or projection 134 placed between the said lower nippers and adapted to separate their jaws against the stress of the spring 133, and means for reciprocating the slide 123 with the nippers and oscillating the rod 135, all substantially as set forth.

21. In a warp-drawing-in machine, the combination, with a tubular heddle-supporting rod and a screw-shaft placed therein, adapted to be turned by hand, of a nut operated by the screw-shaft within the tubular rod, the bar $v$, adapted to move with said nut and connected therewith through a longitudinal slot or keyway in said rod, the hanger G, adapted to slide on the tubular supporting-rod independently of the bar $v$, and a set-screw adapted to couple or connect the hanger with the bar $v$, whereby the hanger can be adjusted longitudinally on its supporting-rod and freely moved along said rod independently of the adjusting-screw when the set-screw is loosened, substantially as set forth.

22. In a warp-drawing-in machine, the within-described reed-holding frame, consisting, essentially, of the horizontal rods 52 53, supported by the frame-work of the machine, the lower one having a long U-shaped socket 54 for the reception of the lower bar of the reed and the upper one being provided with a swinging socket 55, having a series of fingers or projections 57 and adapted to fit over the upper bar of the reed when swung in over the bar 53, combined with a locking-catch for holding the swinging socket in place, substantially as described.

23. In a warp-drawing-in machine, the combination, with a warp-thread-clamping bar, of a tubular supporting-rod connected therewith by lugs sliding on said rod, a screw-shaft placed therein, adapted to be turned by hand, and a nut operated by said screw-shaft within the tubular rod and connected through a longitudinal slot or keyway in said rod with said warp-thread-clamping bar, whereby the latter can be adjusted longitudinally on its supporting-rod, substantially as set forth.

24. In a warp-drawing-in machine, the combination, with the reciprocating warp-drawing-in needle and its sliding carrier, of an actuating-lever provided with a rod sliding in guides thereon and pivoted at one end to the needle-carrier, a crank connected with a slide, moving in guides on said lever and adapted to oscillate the latter, and means for rotating the crank, whereby a reciprocating movement is imparted to the needle, substantially as described.

25. In a warp-drawing-in machine, the combination, with the casing P, of the reciprocating needle Q, with its supporting-guide and carrier, the latter sliding in guides on the casing P, the lever R, fulcrumed at 61, the tubular rod $e^2$, sliding in guides on the lever R and pivoted at its upper end to the needle-carrier, the crank-arm $h^2$, pivoted to a slide moving in guides on the lever R, and means for rotating said crank-arm, the spring $i^2$, inclosed within the tubular rod $e^2$, and the rod $j^2$, having a transverse pin $k^2$ projecting through slots in the tubular rod $e^2$ and adapted to be brought into contact with a stop on the lever R, whereby the spring $i^2$ is compressed just before the needle reaches the end of its stroke in either direction, substantially as and for the purpose described.

Witness my hand this 13th day of March, A. D. 1890.

RICHMOND H. INGERSOLL.

In presence of—
P. E. TESCHEMACHER,
HARRY W. AIKEN.